US010021450B2

(12) United States Patent
Innes et al.

(10) Patent No.: US 10,021,450 B2
(45) Date of Patent: *Jul. 10, 2018

(54) ADVANCE DECRYPTION KEY ACQUISITION FOR STREAMING MEDIA CONTENT

(71) Applicant: DISH Technologies L.L.C., Englewood, CO (US)

(72) Inventors: David Innes, Littleton, CO (US); William Michael Beals, Englewood, CO (US); David Kummer, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,811

(22) Filed: Dec. 13, 2017

(65) Prior Publication Data

US 2018/0115801 A1 Apr. 26, 2018

Related U.S. Application Data

(63) Continuation of application No. 15/465,162, filed on Mar. 21, 2017, now Pat. No. 9,877,069, which is a
(Continued)

(51) Int. Cl.
*H04N 21/438* (2011.01)
*H04N 21/426* (2011.01)
(Continued)

(52) U.S. Cl.
CPC ..... *H04N 21/4384* (2013.01); *H04N 21/2541* (2013.01); *H04N 21/4181* (2013.01);
(Continued)

(58) Field of Classification Search
None
See application file for complete search history.

(56) References Cited

U.S. PATENT DOCUMENTS 6,373,904 B1 4/2002 Sakamoto et al.
7,218,567 B1 * 5/2007 Trimberger ............ G11C 5/141
365/189.08
(Continued)

FOREIGN PATENT DOCUMENTS

EP 1 879 376 A2 1/2008
EP 2 750 398 A1 7/2014
(Continued)

OTHER PUBLICATIONS

European Search Report for EP 13197477 dated Mar. 25, 2014, 2 pages.
(Continued)

*Primary Examiner* — An Son P Huynh
(74) *Attorney, Agent, or Firm* — Kilpatrick Townsend & Stockton, LLP

(57) ABSTRACT

Various arrangements are presented for reducing channel change times. A first tuner of a television receiver may tune to a decryption key transponder stream. The decryption key transponder stream may include a plurality of decryption keys for a plurality of television channels that are transmitted to the television receiver via a plurality of transponder streams. A second tuner of the television receiver may be tuned to a media transponder stream to receive a television channel. Data obtained from the decryption key transponder stream may be used for decoding the television channel.

12 Claims, 12 Drawing Sheets

Related U.S. Application Data continuation of application No. 14/863,143, filed on Sep. 23, 2015, now Pat. No. 9,635,413.

(51) Int. Cl.
| | |
|---|---|
| *H04N 21/4623* | (2011.01) |
| *H04N 21/418* | (2011.01) |
| *H04N 21/254* | (2011.01) |
| *H04N 21/4627* | (2011.01) |
| *H04N 21/61* | (2011.01) |
| *H04N 21/6334* | (2011.01) |

(52) U.S. Cl.
CPC ... *H04N 21/4263* (2013.01); *H04N 21/42623* (2013.01); *H04N 21/4623* (2013.01); *H04N 21/4627* (2013.01); *H04N 21/6143* (2013.01); *H04N 21/6334* (2013.01)

(56) References Cited

U.S. PATENT DOCUMENTS

| | | | |
|---|---|---|---|
| 7,502,587 | B2 | 3/2009 | Petruzzelli |
| 7,546,618 | B2 | 6/2009 | Bacon |
| 7,882,269 | B2* | 2/2011 | Pritchett ............. H04N 21/438 |
| | | | 348/572 |
| 7,929,697 | B2 | 4/2011 | McNeely et al. |
| 9,106,965 | B2 | 8/2015 | Kummer et al. |
| 9,161,090 | B2 | 10/2015 | Kummer et al. |
| 9,635,413 | B2 | 4/2017 | Innes et al. |
| 9,736,418 | B2 | 8/2017 | Casagrande et al. |
| 9,854,306 | B2 | 12/2017 | Wordley |
| 9,877,069 | B2 | 1/2018 | Innes et al. |
| 2002/0042914 | A1 | 4/2002 | Walker et al. |
| 2002/0087973 | A1 | 7/2002 | Hamilton et al. |
| 2002/0092017 | A1 | 7/2002 | Klosterman et al. |
| 2002/0138834 | A1 | 9/2002 | Gerba et al. |
| 2003/0002577 | A1 | 1/2003 | Pinder |
| 2003/0115589 | A1 | 6/2003 | D'Souza et al. |
| 2003/0123657 | A1 | 7/2003 | Bjordammen et al. |
| 2003/0159157 | A1 | 8/2003 | Chan |
| 2003/0196201 | A1 | 10/2003 | Schein et al. |
| 2003/0196211 | A1 | 10/2003 | Chan |
| 2003/0208756 | A1 | 11/2003 | Macrae et al. |
| 2004/0003399 | A1 | 1/2004 | Cooper |
| 2004/0102154 | A1 | 5/2004 | Klauss et al. |
| 2004/0117827 | A1 | 6/2004 | Karaoguz et al. |
| 2004/0148628 | A1 | 7/2004 | Mears |
| 2004/0181800 | A1 | 9/2004 | Rakib et al. |
| 2004/0181813 | A1 | 9/2004 | Ota et al. |
| 2004/0189873 | A1 | 9/2004 | Konig et al. |
| 2004/0255336 | A1 | 12/2004 | Logan et al. |
| 2005/0015803 | A1 | 1/2005 | Macrae et al. |
| 2005/0175178 | A1* | 8/2005 | Candelore ............ H04N 7/1675 |
| | | | 380/201 |
| 2005/0201559 | A1 | 9/2005 | Van Der Heijden |
| 2005/0283797 | A1 | 12/2005 | Eldering et al. |
| 2006/0053077 | A1 | 3/2006 | Mourad et al. |
| 2006/0064383 | A1* | 3/2006 | Marking ............ G06Q 20/3829 |
| | | | 705/57 |
| 2006/0109982 | A1* | 5/2006 | Puiatti ................... H04N 5/913 |
| | | | 380/200 |
| 2006/0206912 | A1 | 9/2006 | Klarfeld et al. |
| 2007/0040947 | A1 | 2/2007 | Koga |
| 2007/0107010 | A1 | 5/2007 | Jolna et al. |
| 2007/0109445 | A1 | 5/2007 | Lee |
| 2007/0115391 | A1 | 5/2007 | Anderson |
| 2007/0136753 | A1 | 6/2007 | Bovenschulte et al. |
| 2007/0188665 | A1 | 8/2007 | Watson et al. |
| 2007/0192586 | A1* | 8/2007 | McNeely ........... H04B 7/18523 |
| | | | 713/153 |
| 2008/0022299 | A1 | 1/2008 | Le Buhan |
| 2008/0066111 | A1 | 3/2008 | Ellis et al. |
| 2008/0086745 | A1 | 4/2008 | Knudson et al. |
| 2008/0271076 | A1 | 10/2008 | Schlack |
| 2009/0153747 | A1* | 6/2009 | Grimes .............. H04N 21/4332 |
| | | | 348/731 |
| 2009/0178079 | A1 | 7/2009 | Derrenberger et al. |
| 2009/0183196 | A1* | 7/2009 | Chen ...................... H04L 63/062 |
| | | | 725/31 |
| 2009/0199003 | A1* | 8/2009 | Gerritsen ............... H04N 7/163 |
| | | | 713/172 |
| 2009/0199238 | A1 | 8/2009 | Kummer |
| 2009/0260040 | A1 | 10/2009 | Kritt et al. |
| 2009/0313674 | A1 | 12/2009 | Ludvig et al. |
| 2009/0322962 | A1 | 12/2009 | Weeks |
| 2010/0131983 | A1 | 5/2010 | Shannon et al. |
| 2010/0199299 | A1 | 8/2010 | Chang et al. |
| 2011/0055866 | A1 | 3/2011 | Piepenbrink et al. |
| 2011/0093897 | A1 | 4/2011 | Gerba et al. |
| 2011/0131622 | A1 | 6/2011 | Wu et al. |
| 2011/0219396 | A1* | 9/2011 | Kudelski ............... H04L 9/0877 |
| | | | 725/31 |
| 2011/0247037 | A1 | 10/2011 | Pandey et al. |
| 2011/0310305 | A1 | 12/2011 | Alexander |
| 2012/0008773 | A1* | 1/2012 | Westerveld .......... H04N 7/1675 |
| | | | 380/220 |
| 2012/0131627 | A1 | 5/2012 | Chittella |
| 2012/0204023 | A1* | 8/2012 | Kuipers ................... G06F 21/10 |
| | | | 713/150 |
| 2012/0222066 | A1 | 8/2012 | Charania et al. |
| 2012/0311649 | A1 | 12/2012 | Patten et al. |
| 2013/0014162 | A1 | 1/2013 | Chen et al. |
| 2013/0135535 | A1 | 5/2013 | Ling |
| 2013/0339997 | A1* | 12/2013 | Farkash ............ H04N 21/23439 |
| | | | 725/31 |
| 2014/0086407 | A1* | 3/2014 | Gustafsson .......... H04N 21/434 |
| | | | 380/210 |
| 2014/0146737 | A1* | 5/2014 | Ohshima ................. H04W 4/06 |
| | | | 370/312 |
| 2014/0173649 | A1* | 6/2014 | Medapati ............... H04N 5/783 |
| | | | 725/25 |
| 2014/0189736 | A1 | 7/2014 | Kummer et al. |
| 2014/0189739 | A1 | 7/2014 | Kummer et al. |
| 2014/0196094 | A1 | 7/2014 | Singh et al. |
| 2014/0229972 | A1* | 8/2014 | Kudelski ........... H04N 21/26606 |
| | | | 725/31 |
| 2014/0269930 | A1 | 9/2014 | Robinson et al. |
| 2014/0282759 | A1 | 9/2014 | Harvey et al. |
| 2015/0095948 | A1 | 4/2015 | Kummer et al. |
| 2015/0312513 | A1 | 10/2015 | Kummer et al. |
| 2016/0007091 | A1* | 1/2016 | Woodward ......... H04N 21/6543 |
| | | | 725/133 |
| 2016/0029082 | A1 | 1/2016 | Wordley |
| 2017/0085940 | A1 | 3/2017 | Innes et al. |
| 2017/0195715 | A1 | 7/2017 | Innes et al. |
| 2018/0049089 | A1* | 2/2018 | Theogaraj ............ H04L 67/142 |

FOREIGN PATENT DOCUMENTS

| | | |
|---|---|---|
| JP | H07 75015 A | 3/1995 |
| JP | 2009-130755 A | 6/2009 |
| WO | 2012/112928 A2 | 8/2012 |

OTHER PUBLICATIONS

International Search Report and Written Opinion for PCT/GB2015/052022 dated Oct. 8, 2015, all pages.

U.S. Appl. No. 13/833,728, filed Mar. 15, 2013, Non-Final Office Action dated Sep. 29, 2014, 34 pages.

U.S. Appl. No. 13/833,728, filed Mar. 15, 2013, Final Rejection dated Jan. 29, 2015, 31 pages.

U.S. Appl. No. 13/833,728, filed Mar. 15, 2013, Notice of Allowance dated Apr. 9, 2015, 21 pages.

U.S. Appl. No. 13/839,220, filed Mar. 12, 2013, Non-Final Office Action dated Sep. 26, 2014, 24 pages.

U.S. Appl. No. 13/839,220, filed Mar. 12, 2013, Final Office Action dated Jan. 21, 2015, 23 pages.

U.S. Appl. No. 13/839,220, filed Mar. 12, 2013, Notice of Allowance dated Jun. 3, 2015, 22 pages.

(56) References Cited

OTHER PUBLICATIONS

U.S. Appl. No. 14/444,071, filed Jul. 28, 2014, Non-Final Office Action dated Oct. 22, 2015, 24 pages.
U.S. Appl. No. 14/444,071, filed Jul. 28, 2014, Final Office Action dated Apr. 27, 2016, all pages.
U.S. Appl. No. 14/444,071, filed Jul. 28, 2014, Non-Final Office Action dated Dec. 2, 2016, all pages.
U.S. Appl. No. 14/444,071, filed Jul. 28, 2014, Final Office Action dated Apr. 28, 2017, all pages.
U.S. Appl. No. 14/444,071, filed Jul. 28, 2014, Notice of Allowance dated Aug. 14, 2017, all pages.
U.S. Appl. No. 15/465,162, filed Mar. 21, 2017, Notice of Allowance dated Sep. 27, 2017, all pages.
U.S. Appl. No. 14/863,143, filed Sep. 23, 2015 Non Final Rejection dated Aug. 23, 2016 , all pages.
U.S. Appl. No. 14/863,143, filed Sep. 23, 2015 Notice of Allowance dated Dec. 21, 2016, all pages.
U.S. Appl. No. 14/789,737, filed Jul. 1, 2015 Non-Final Rejection dated Nov. 22, 2016, all pages.
U.S. Appl. No. 14/789,737, filed Jul. 1, 2015 Notice of Allowance dated Apr. 26, 2017, all pages.
Office Action for EP 13197477.6 dated Nov. 24, 2016, all pages.

\* cited by examiner

US 10,021,450 B2

ADVANCE DECRYPTION KEY ACQUISITION FOR STREAMING MEDIA CONTENT

CROSS REFERENCES TO RELATED APPLICATIONS

This Application is a continuation of U.S. patent application Ser. No. 15/465,162, filed Mar. 21, 2017, which is a continuation of U.S. patent application Ser. No. 14/863,143, filed Sep. 23, 2015, the disclosures of which are incorporated by reference herein in their entireties.

BACKGROUND

When analog television service was the norm, "channel surfing" was a common occurrence. Rather than referring to a guide listing out the available television programming, a user may have picked up a remote control and repeatedly pressed "channel up" or "channel down" until a television program was displayed that caught the user's attention. At least in part due to the changed format of television service provider networks, such channel surfing has become less prevalent. As television service providers have transitioned to digital distribution networks, the ability for user equipment to quickly tune to a particular television channel may have diminished. For instance, due to factors such as video compression, it may take multiple seconds after a television channel is selected before the video for the selected television channel is available for presentation. Due to this delay time, a user may find it frustratingly slow to repeatedly change television channels.

SUMMARY

Various systems, methods, and computer-readable mediums are presented for channel tuning. A first tuner of a television receiver may be tuned to a decryption key transponder stream, wherein the decryption key transponder stream comprises a plurality of decryption keys for a plurality of television channels that are transmitted to the television receiver via a plurality of transponder streams. The plurality of decryption keys may be buffered. A second tuner of the television receiver may be tuned to a media transponder stream to receive a television channel of the plurality of television channels, wherein the media transponder stream comprises, for multiple television channels, video packets and audio packets. A decryption key may be decrypted from the plurality of buffered decryption keys obtained from the decryption key transponder stream, the decryption key corresponding to the television channel. The television channel may be decoded using the decryption key.

In various embodiments, one or more of the follow features may be present: Prior to tuning the first tuner of the television receiver to the decryption key transponder stream, it may be determined that the first tuner of the television receiver is idle. The first tuner being idle may refer to the first tuner not being used for receiving any transponder stream for output by the television receiver or recording by the television receiver. The first tuner of the television receiver may be tuned to the decryption key transponder stream in response to determining that the first tuner of the television receiver is idle. The plurality of decryption keys may be a plurality of entitlement control messages (ECMs). The media transponder stream may include decryption keys corresponding to only television channels present in the media transponder stream. A stored table may be accessed that was received from a television service provider that indicates a packet identifier of the decryption key that corresponds to the television channel. The decryption key from the buffered plurality of decryption keys may be retrieved based on the packet identifier. Decrypting the decryption key may include a smart card of the television receiver using the decryption key to obtain a control word. The decryption key may be encrypted by the television receiver using a session key, wherein the encrypted decryption key is then buffered. Decoding the television channel using the decryption key may include decoding video packets and audio packets corresponding to the television channel using the control word obtained from the decryption key. The plurality of television channels may be 25 or greater and the plurality of transponder streams may be 5 or greater.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components or by a letter designation following a callout number. If only the first reference label is used in the specification, the description is applicable to any one of the similar components having the same first reference label irrespective of the second reference label.

DETAILED DESCRIPTION

Figure 1:
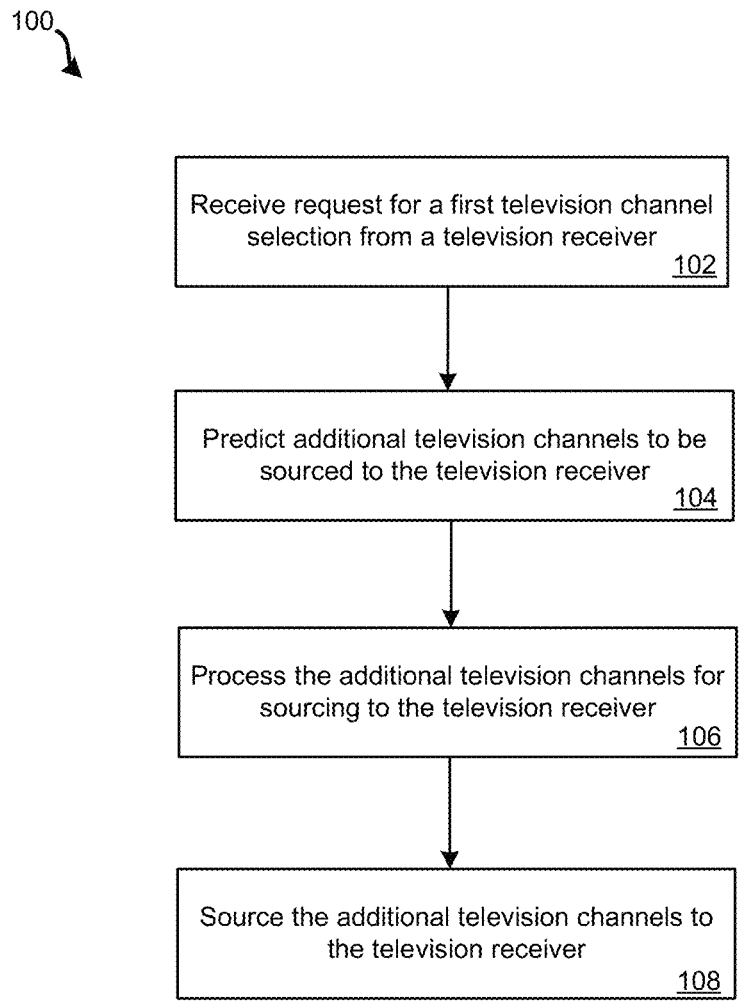
FIG. 1 illustrates an embodiment of a method of how additional television channels may be predicted and acquired ahead of user selection.

An outdoor satellite unit (ODU) in a satellite television implementation may refer to equipment located outside of a particular building, as opposed to one or more receivers located within the building. More particularly, the ODU may comprise at least a satellite dish and a LNB (Low-Noise Block Downconverter). In one example, the LNB may be mounted to or integrated with a feedhorn coupled to a particular satellite dish. The LNB may include multiple RF (Radio Frequency) inputs or probes and multiple RF outputs or ports. The multiple RF inputs or probes may operate independently from each other, and each may detect or receive incoming signals that are broadcast from multiple different satellites. The multiple RF outputs may operate independently from each other, and each may be coupled to a particular television receiver located inside the building via a coaxial cable, sometimes referred to as a "cable drop," to source channels containing programming to the receiver. More particularly, the LNB may amplify and convert incoming satellite signals to an intermediate frequency band, such as L-Band or S-Band for example, for transmission across the coaxial cable to the television receiver. Further, in a multi-tuner receiver implementation, the LNB and/or other processors of the ODU may process the incoming satellite signals so that the LNB may source particular channels containing programming requested by the television receiver to the receiver according to a specific sourcing scheme that is implementation-specific.

For example, a particular LNB may be "band-translation-enabled" so that the LNB may source channels containing programming to a particular multi-tuner receiver that is also band-translation-enabled. Such an implementation or technique is described in U.S. Pat. No. 7,502,587, the entirety of which is hereby incorporated by reference. A band-translation implementation may be beneficial at least because an appropriately configured LNB may select at least two frequency bands from any combination of satellites and dishes, and stack and send those bands on a single coaxial cable to a particular multi-tuner receiver for further processing. In many instances, a single cable drop may be desirable at least for aesthetic and possibly practical reasons. Other schemes are possible as well, as discussed in further detail below.

As a general matter, this disclosure may use the term "signal." A signal may be any digital or analog signal. Those signals may include, but are not limited to, at least one of a bit, a specified set of bits, an A/C signal, or a D/C signal. Uses of the term "signal" may include any of these different interpretations. Further, satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO, CSPAN, ABC, CBS, ESPN, etc. Further, the term "channel" may carry a different meaning from its normal connotation. The term "channel" may denote a particular carrier frequency or "sub-band" which can be tuned to by an appropriate tuner. The term "channel" may not refer to a single program/content service such as HBO, CSPAN, etc. Similarly, "tuning" may refer to receiving a channel having multiple services thereon. A single satellite may typically have multiple transponders (e.g., 32 transponders), each one broadcasting a channel or band of about 24-27 MHz in a broader frequency "band" of about 500 MHz. Thus, a band of about 500 MHz may contain numerous sub-bands or channels of about 24-27 MHz, and each channel in turn may carry a combined stream of digital data comprising a number of content services.

In accordance with this and other contexts, the present disclosure is directed to a channeling module provided in at least one of the ODU and/or the television receiver in communication with the ODU. In the context of the ODU, the channeling module provided therein may be programmed to predict and source channels containing particular programming to a particular television receiver upon a request received from the television receiver. For instance, the channeling module of the ODU may communicate with another channeling module provided for in the television receiver, whereby the channeling module in the television receiver is configured to send and receive signals and data that facilitates the communication of the predicted source channels from the ODU's channeling module. In either or both implementations, the channeling module may enable faster television channel changes by reducing lag time that may exist between when a television channel is selected by a user and when the television channel's video is decoded and is output for presentation, such as to a television.

Referring now to FIG. 1, an example method 100 is shown in accordance with the present disclosure. In general, steps, operations, or modules of the method 100 as described may ultimately be implemented by at least one of an ODU and the television receiver of a satellite television system, such as the satellite system shown in FIG. 2. Other examples are, however, possible. For example, one or more steps or modules of the method 100 may be implemented wholly or at least partially by or on one or more of the other respective devices or components of the satellite system.

The example method 100 may comprise receiving (step 102) a request for a first television channel selection from a television receiver. For instance, the request may be initiated at the television receiver upon manual entry from the user through a remote control device. It is contemplated that such input may be a particular channel entered in by the user, a channel-surfing-type entry, and/or a channel that is tuned to based on a predetermined schedule. For instance, the user may input user preferences for the television receiver to tune to the first television channel at a certain time of day, such as tuning to "channel 11" at 4 PM on weekdays to display and/or record a particular show.

The method 100 may further comprise predicting (step 104) additional television channels to be sourced to the television receiver. For instance, upon receiving the request for the first television channel selection, the channeling module may select one or more additional television channels comprising sequential television channels, channels in a common genre as the first television channel, frequently viewed channels, popular channels, channels based on a time of day, e.g. news-broadcasting channels on Monday evenings, and so on, as described in further detail below. In another aspect, the predictive sourcing may include steps directed to identifying, by the channeling module, idle tuners and/or decoders available at the television receiver. For instance, the television receiver may send signals and/or data to the channeling module, continuously or upon request by the channeling module, regarding information on resource availability. The prediction may account for such resources available at the television receiver, as described in further detail below.

Further, the method 100 comprises processing (step 106) the additional television channels for sourcing to the television receiver. For instance, the channeling module may determine which transponder streams include the additional television channels that were predicted (at step 104) and prepare such transponder streams for transmission as output signals to the television receiver. Further, it is contemplated that the output signals may be provided for in a dual-band, triple-band, and/or a channel-stacking methodology. Merely by way of example, the channeling module may identify a particular configuration of the television receiver and configure the output signals to a format that corresponds to formatting of the television receiver. It is contemplated that the formatting may be dynamic and vary among different television receivers, and that the channeling module may actively determine a proper format to implement.

The method 100 may further comprise sourcing (step 108) the additional television channel(s) to the television receiver, for instance through the coaxial cable connecting the ODU and the television receiver. It is contemplated that the sourced channels may be directed to particular tuners, such as the idle tuners, at the television receiver and subsequently decoded. The decoded channels may be discarded by the television receiver after use. Furthermore, it is contemplated that the channeling module continuously implements the method 100 to continuously provide predictive channel sourcing.

Figure 2:
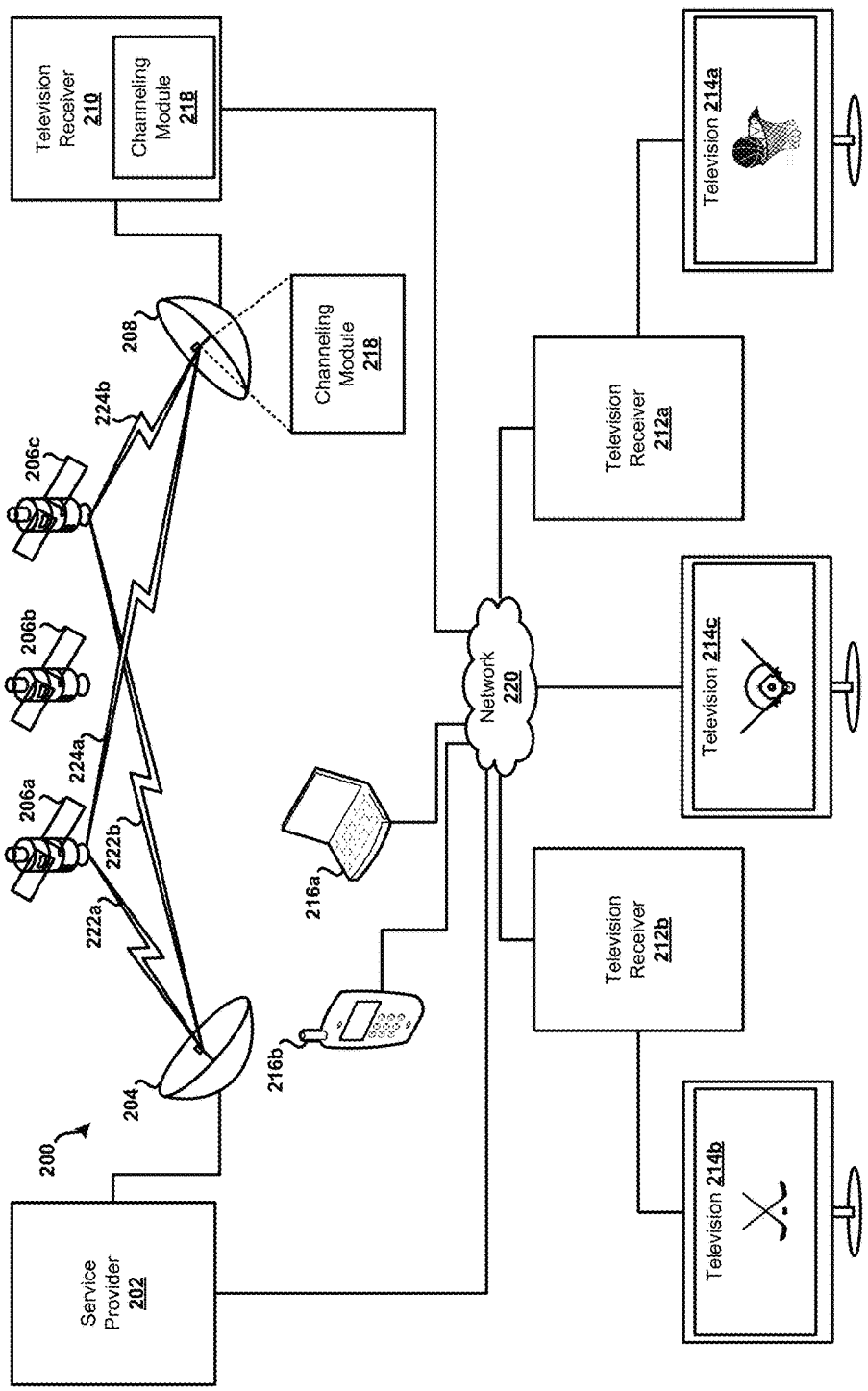
FIG. 2 illustrates an embodiment of a satellite system that distributed multiple media streams of content to television receivers.

For instance, referring now to FIG. 2, an example satellite system 200 is shown in accordance with the present disclosure. For brevity, the satellite system 200 is depicted in a simplified form, and may generally include more or fewer systems, devices, networks, and/or other components as desired. Further, the number and type of features or elements incorporated within the satellite system 200 may or may not be implementation-specific, and at least some of the aspects of the satellite system 200 may be similar to a cable television distribution system, an IPTV (Internet Protocol Television) content distribution system, and/or any other type of content distribution system.

In this example, the satellite system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, and a plurality of computing devices 216a-b. The satellite dish 208 and/or the PTR 210 may include a channeling module 218. As discussed throughout, the channeling module 218 may be programmatically configured to predictively source channels containing programming to at least the PTR 210. In some examples, the predictive sourcing of channels is provided according to a particular hardware and/or firmware architecture of the PTR 210. In another example, both of the satellite dish 208 and the PTR 210 comprise channeling modules 218 that communicate with one another to provide for predictive sourcing of channels to the television receiver 210. Still, in further aspects, the channeling module 218 of either the satellite dish 208 and/or the PTR 210 is configured to provide for at least the method 100 provided in FIG. 1. Such implementations may be beneficial and/or advantageous in many respects, as described further in the succeeding paragraphs.

The satellite system 200 may also include at least one network 220 that establishes a bi-directional communication path for data transfer between and among each respective element of the satellite system 200 outside of the unidirectional satellite signaling path. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 200.

The PTR 210, and the STRs 212a-b, as described throughout may generally be any type of television receiver, television converter, etc., such as a STB (Set-Top-Box) for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 220, together with the STRs 212a-b and televisions 214a-c, and possibly the computing devices 216a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example satellite system 200 may be configured to communicate in accordance with the MoCA (Multimedia over Coax Alliance) home entertainment networking standard. Still other examples are possible.

In practice, the satellites 206a-c may each be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such as a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. A transponder stream may include packetized data that contains an identifier. Based on the identifier, the television receiver can determine which television channel it corresponds to, whether it is audio, video, or other data (e.g., related to decryption and descrambling). Different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b (for simplicity of FIG. 1, wireless signals are not illustrated as being received or sent by satellite 206b), or the third, fourth, and fifth television channel may be carried on a second carrier frequency over a second transponder of satellite 206a, and etc. Thus, in order to receive television channels on separate transponder streams, it may be necessary to have multiple tuners (such that a tuner can be tuned to each transponder stream) or retune a single tuner (such that the tuner is retuned from a first transponder stream to a second transponder stream). Multiple low noise blocks (LNBs) may also be necessary to receive separate transponder streams.

The satellites 206a-c may further be configured to relay the uplink signals 222a-b to the satellite dish 208 as downlink signals 224a-b. Similar to the uplink signals 222a-b each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation-specific scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. In this example, the HD channel may be output to the television 214c in accordance with the HDMI/HDCP content protection technologies. Other examples are possible.

Further, the PTR 210 may select via tuner, decode, and relay particular transponder streams to one or both of the STRs 212a-b, which may in turn relay particular transponder streams to a corresponding one of the television 214a and the television 214b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of STR 212a in accordance with a particular content protection technology and/or networking standard. Still further, the satellite dish 208 and the PTR 210 may, respectively, be configured to receive, decode, and relay at least one premium television channel to one or both of the computing devices 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
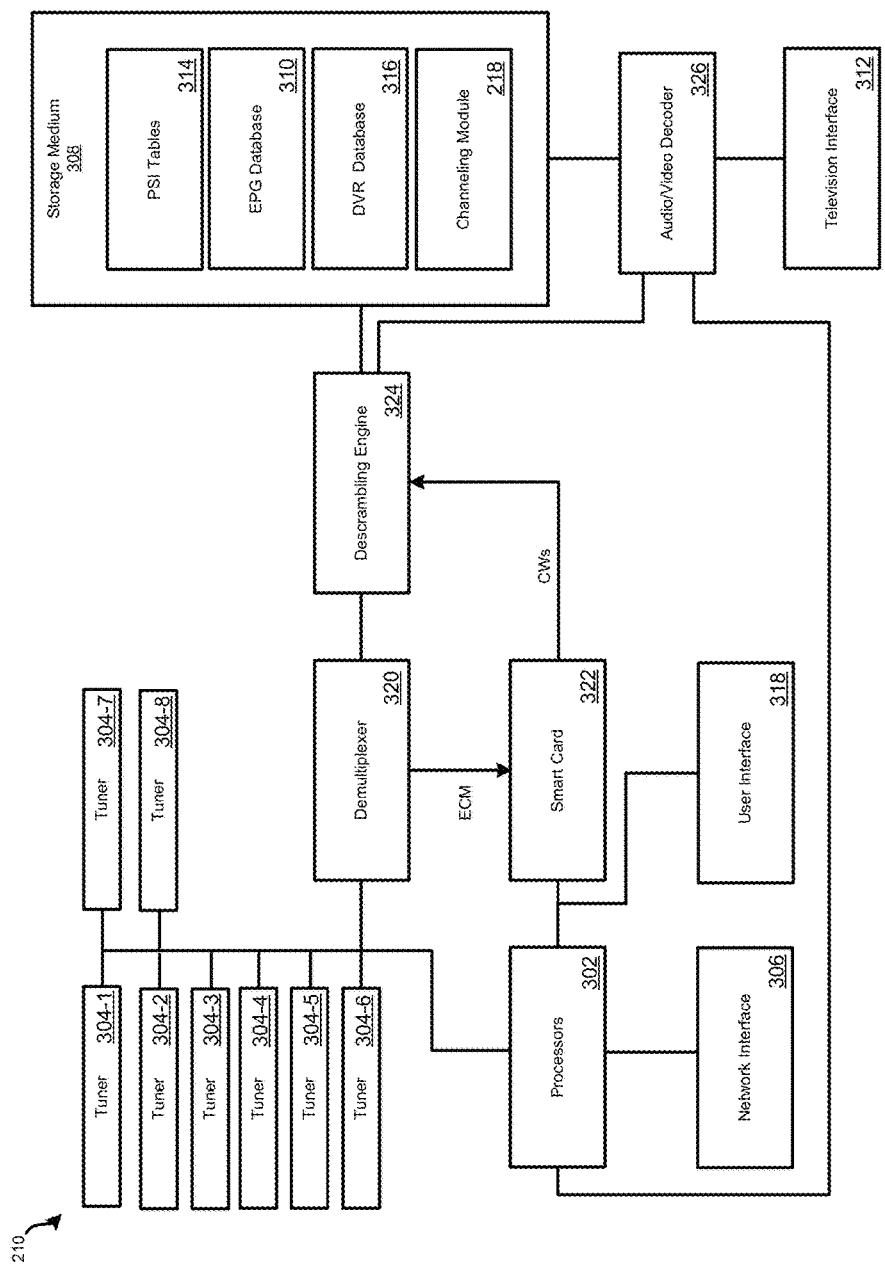
FIG. 3 illustrates an embodiment of a television receiver.

Referring now to FIG. 3, an example block diagram of the PTR 210 of FIG. 2 is shown in accordance with the present disclosure. In some examples, at least one of the STRs 212a-b may be configured in a manner similar to that of the PTR 210. In other examples, at least one of the STRs 212a-b may be configured to exhibit a reduced functionality as compared to the PTR 210, and may depend at least to a certain degree on the PTR 210 to implement certain features or functionality. In this example, the STRs 212a-b may be referred to as a "thin client."

For brevity, the PTR 210 is depicted in a simplified form, and may generally include more or fewer elements or components as desired in accordance with the present disclosure. For example, the PTR 210 is shown in FIG. 3 to include the channeling module 218. In general, and as discussed in further detail below, the channeling module 218 may be configured to provide for one or more aspects of predictive sourcing of channels using one or more particular sourcing schemes, sometimes referred to as a "mode," that the PTR 210 is configured to exhibit. One example sourcing scheme may include or correspond to a "band-translation mode." Another example sourcing scheme may include or correspond to a "channel-stacking mode." Other examples are possible as well. Merely by way of example, the channeling module 218 in the PTR 210 may communicate with a channeling module 218 provided for in the satellite dish 208 to receive predicted source channels from the satellite dish 208. Even further, the channeling module 218 in the PTR 210 and/or the satellite dish 208 may predict possible channels that a user might watch in the future and source the predicted channels for output from the PTR 210 to a display screen, such as one or more screens of televisions 214a-c. Furthermore, the sourcing scheme may source channels containing programming to any particular receiver according to a receiver-specific configuration, such as band-translation mode and/or channel-stacking mode.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox by Sling Media, Inc. of Foster City, Calif., is one example of a product that implements such functionality. Additionally, the PTR 210 may be configured to include any number of other various components or logical modules that are implemented in hardware, software, firmware, or any combination thereof, and such components or logical modules may or may not be implementation-specific.

Referring still to FIG. 3, the PTR 210 in this example includes one or more processors 302, a plurality of tuners 304-1 through 304-8, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling. Such decoding hardware is represented as audio/video decoder 326.

The tuners 304-1 through 304-8 may be used to tune to television channels, such as television channels transmitted via satellites (not shown). Each one of the tuners 304-1 through 304-8 may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304-1) may be used to tune to a television channel on a first transponder stream for display using a television, while another tuner (e.g., tuner 304-2) may be used to tune to a television channel on a second transponder for recording and viewing at some other time. If multiple television channels transmitted on the same transponder stream are desired, a particular tuner (e.g., tuner 304-3) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scaled according to the number of tuners of the PTR 210.

The network interface 306 may be used to communicate via alternate communication channel(s) with a service provider. For example, the primary communication channel between the service provider 202 of FIG. 2 and the PTR 210 may be via satellites, which may be unidirectional to the PTR 210, and another communication channel between the service provider 202 and the PTR 210, which may be bidirectional, may be via a network, such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the satellite system 200. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the channeling module 218 mentioned above. Recorded television programs may be stored using the storage medium 308.

The EPG database 310 may store information related to television channels and the timing of programs appearing on such television channels. Information from the EPG database 310 may be used to inform users of what television channels or programs are available or popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously.

The television interface 312 outputs a signal to a television, or another form of display device, in a proper format for display of video and play back of audio. As such, the television interface 312 may output one or more television channels, stored television programming from the storage medium 308, such as television programs from the DVR database 316 and/or information from the EPG database 310, for example, to a television for presentation.

The PSI table 314 may store information used by the PTR 210 to access various television channels. Information used to populate the PSI table 314 may be received via satellite, or cable, through the tuners 304-1 through 304-8 and/or may be received via the network interface 306 over the network from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on the satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more viewers or users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allow a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304-1 through 304-8, television channels received via satellite may contain at least some encrypted or scrambled data. Packets of audio and video may be scrambled to prevent unauthorized users, such as nonsubscribers, from receiving television programming without paying the service provider 202. When one of the tuners 304-1 through 304-8 is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs, may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. In some embodiments, rather than the controlled access module being in the form of a smart card, it may be in some other form of hardware, software, or firmware, such as incorporated as part of processors 302. Whether in the form of smart card 322 or some other form, the controlled access module may or may not be removable from the television receiver. Decryption of an ECM may only be possible when the user, e.g., an individual who is associated with the PTR 210, has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304-1 through 304-8 may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the channeling module 218 as mentioned above in connection with FIG. 2. Further, some routing between the various modules of the PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
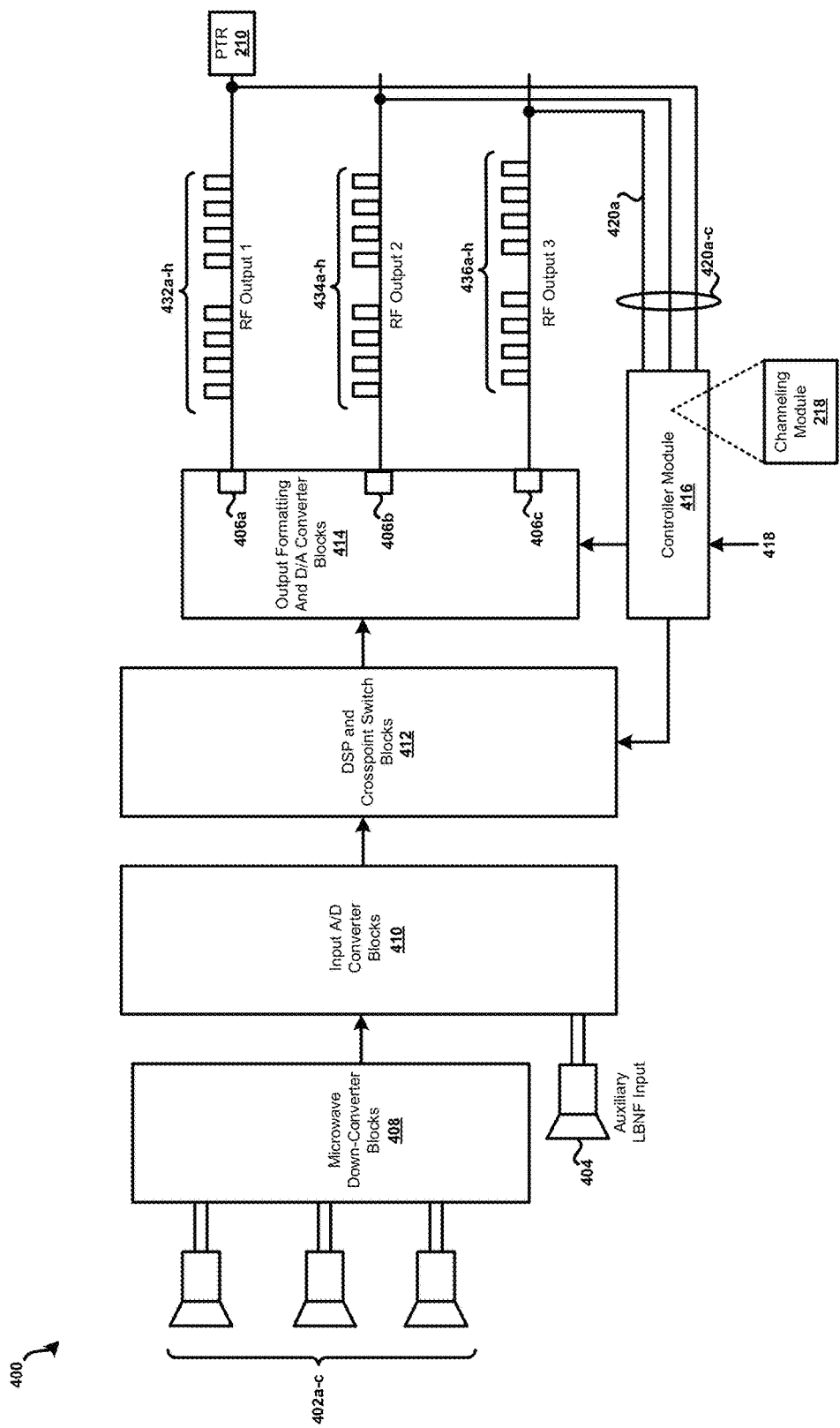
FIG. 4 illustrates a block diagram of an embodiment of a low-noise block (LNB) downconverter.

Referring now to FIG. 4, a simplified example architecture of an LNB 400 is shown in accordance with the present disclosure. The LNB 400 is located at the satellite dish 208 shown in FIG. 2. It is contemplated that one or more modules or components of the LNB 400 may be realized in or as, or incorporated within or on, for example, an ASIC (Application Specific Integrated Circuit), SoC (System on Chip), and/or other type of integrated circuit implementation. In FIG. 4, the LNB 400 is configured as a channel-stacking LNB, although other schematics may be provided, such as a dual-band translation LNB or a triple-band translation LNB. It is contemplated that the LNB 400 may be programmed or reprogrammed in the field to exhibit any one of a dual-band band translation mode, a triple-band band translation mode, and a channel-stacking mode, to source channels containing programming to the PTR 210, for example, based on the particular configuration or mode of the PTR 210. Other modes are possible as well, and the example architecture shown in FIG. 4 may include other components to mediate and or process signals.

The LNB 400 may be mounted to or integrated with a feedhorn that is coupled to the satellite dish 208 of FIG. 2, but may include RF probes 402a-c, along with an auxiliary RF probe 404, and RF output ports 406a-c. In this example, the probes 402a-c may operate independently from each other, and the LNB 400 may detect or receive incoming signals broadcast from each of the satellites 206a-c via the probes 402a-c, assuming that the satellite dish 208 is properly orientated towards the sky. The ports 406a-c too may be independent from each other, and each of the respective ports 406a-c may be coupled to a particular distinct receiver via coaxial cable, for example, to source channels containing programming as requested by each respective receiver. In operation, a first stage 408 in the signal path may at least amplify and mix down incoming satellite signals to an intermediate frequency band, such as L-Band or S-Band for example. It is contemplated that the first stage 408 may be implementation-specific, and may evolve as technology evolves. In one example, the first stage 408 may be realized as or include a heterodyne along with additional components to mix down an input signal down to an IF frequency. Other examples are, however, possible. For example, the first stage 408 may be implemented as a direct conversion block, where an input signal is mixed down to baseband. Still other examples are possible.

A second stage 410 in the signal path may sample incoming satellite signals according to the Nyquist Theorem so that the signals may be further processed in the digital domain following the second stage 410. A third stage 412 and a fourth stage 414 in the signal path may operate on or further process the digitized signals so that the LNB 400 may source channels containing programming to a particular receiver coupled to a particular one of the ports 406a-c. For example, when a particular receiver coupled to the port 406a is configured as a triple-band band translation device, the third stage 412 and the fourth stage 414 may together serve to format the output of the second stage 410 so that data output on port 406a is formatted according to a triple-band band translation mode. In another example, when a particular receiver coupled to the port 406b is configured as a channel-stacking device, the third stage 412 and the fourth stage 414 may together serve to format the output of the second stage 410 so that data output on port 406b is formatted according to a channel-stacking mode. In still another example, when a particular receiver coupled to the port 406c is configured as a dual-band band translation device, the third stage 412 and the fourth stage 414 may together serve to format the output of the second stage 410 so that data output on port 406c is formatted according to a dual-band band translation mode. Still many other configurations are possible.

For example, and mentioned above, the LNB 400 of FIG. 4 may be configured as a dual-band translation LNB. Accordingly, a first band with a width of about 500 MHz and a second band with a width of about 500 MHz may be created and output by the LNB 400 on port 406a. Further, a third band with a width of about 500 MHz and a fourth band with a width of about 500 MHz may be created and output by the LNB 400 on port 406b. Still further, a fifth band with a width of about 500 MHz and a sixth band with a width of about 500 MHz may be created and output by the LNB 400 on port 406c. In the dual-band implementation, it is contemplated that the architecture of LNB 400 is intended to represent or indicate that each tuner of a particular two tuner receiver coupled to the port 406a via coaxial cable may request any frequency band from any one of the satellites 206a-c, and yet receive the frequency band in the frequency range for which a corresponding tuner has already been programmed. For example, a particular tuner of the PTR 210 may be programmed to receive the band 950-1450 MHz (i.e., within L-band), while another particular tuner of the PTR 210 may be programmed to receive the band 1650-2150 MHz (i.e., within S-band). However, more than one tuner of the PTR 210 may be may be programmed to receive the same or similar band, such as the band 950-1450 MHz. Additionally, each tuner of a particular two tuner receiver coupled to the port 406b via coaxial cable may request any frequency band from one of the satellites 206a-c, and yet receive the frequency band in the frequency range for which a corresponding tuner has already been programmed. Still further, each tuner of a particular two tuner receiver coupled to the port 406a c via coaxial cable may request any frequency band from one of the satellites 206a-c, and yet receive the frequency band in the frequency range for which a corresponding tuner has already been programmed.

In the dual-band implementation for FIG. 4, it is noted that a particular polarity band (e.g., right hand circular polarized, left hand circular polarized, etc.) broadcast by a particular satellite is about 500 MHz wide, and thus each of the respective first through sixth dual-band bands may be distinct and correspond to a particular polarity band broadcast by a particular satellite. In this manner, the LNB 400 is configured as a dual-band translation LNB and may be analogous to a polarity band selection or filter that selects between a right hand circular polarized beam and left hand circular polarized beam depending on implementation. Each polarity band passed to a particular receiver may be processed by the receiver so that a particular requested service (e.g., HBO, CNN, etc.) may be output by the receiver for presentation by a display device, such as the television 214c of FIG. 2 for example. In the dual-band LNB example, the intermediate frequency band used to transfer the respective first through sixth dual bands to a particular receiver may have a width of about 1 GHz. Other examples are possible.

For example, and mentioned above, the LNB 400 of FIG. 4 may be configured as a triple-band translation LNB. Accordingly, a first band with a width of about 500 MHz, a second band with a width of about 500 MHz, and a third band with a width of about 500 MHz may be created and output by the LNB 400 on the port 406a. Further, a fourth band with a width of about 500 MHz, a fifth band with a width of about 500 MHz, and a sixth band with a width of about 500 MHz may be created and output by the LNB 400 on the port 406b. Still further, a seventh band with a width of about 500 MHz, an eighth band with a width of about 500 MHz, and a ninth band with a width of about 500 MHz may be created and output by the LNB 400 on the port 406c. In general, in regard to the triple-band implementation, the architecture shown in FIG. 4 is intended to represent or indicate that each tuner of a particular three tuner receiver coupled to the port 406a via coaxial cable may request any frequency band from any one of the satellites 206a-c, and yet receive the frequency band in the frequency range for which a corresponding tuner has already been programmed. Further, each tuner of a particular three tuner receiver coupled to the port 406b via coaxial cable may request any frequency band from one of the satellites 206a-c, and yet receive the frequency band in the frequency range for which a corresponding tuner has already been programmed. Still further, each tuner of a particular three tuner receiver coupled to port 406c via coaxial cable may request any frequency band from one of the satellites 206a-c, and yet receive the frequency band in the frequency range for which a corresponding tuner has already been programmed.

As mentioned above, a particular polarity band broadcast by a particular satellite is about 500 MHz wide, and thus each of the respective first through ninth triple-band bands may be distinct and correspond to a particular polarity band broadcast by a particular satellite. In this manner, the LNB 400 is configured as a triple-band translation LNB and may be analogous to a polarity band filter. Each polarity band passed to a particular receiver may be processed by the receiver so that a particular requested service (e.g., HBO, CNN, etc.) may be output by the receiver for presentation by a display device, such as the television 214c of FIG. 2 for example. In the triple-band example, the intermediate frequency band used to transfer the respective first through ninth bands to a particular receiver may have a width of about 1.5 GHz. Other examples are possible.

For example, as shown in FIG. 4, and mentioned above, the LNB 400 of FIG. 4 is configured as a channel-stacking LNB. Accordingly, a first plurality of bands 432a-h, each with a width of about 30 MHz, are shown as being created and output by the LNB 400 on the port 406a. Further, a second plurality of bands 434a-h, each with a width of about 30 MHz, are shown as being created and output by the LNB 400 on the port 406b. Still further, a third plurality of bands 436a-h, each with a width of about 30 MHz, are shown as being created and output by the LNB 400 on the port 406c.

In general, FIG. 4 is intended to represent that each tuner of a particular eight tuner receiver coupled to the port 406a a via coaxial cable may request any frequency band from one of the satellites 206a-c, and yet receive the frequency band in the frequency range for which a corresponding tuner has already been programmed. Further, each tuner of a particular eight-tuner receiver coupled to the port 406b via coaxial cable may request any frequency band from one of satellite 206a-c and yet receive it in the frequency range for which a respective tuner has already been programmed. Still further, each tuner of a particular eight tuner receiver coupled to the port 406c via coaxial cable may request any frequency band from one of satellite 206a-c, and yet receive the frequency band in the frequency range for which a corresponding tuner has already been programmed.

Here, it is noted that a particular transponder band within a particular polarity band broadcast by a particular satellite is about 30 MHz, and thus each of the respective bands 432a-h, 434a-h, and 436a-h may be distinct and correspond to a particular transponder band within a particular polarity band broadcast by a particular satellite. In this manner, the LNB 400 is configured as a channel-stacking LNB and may be considered analogous to a transponder band filter. Each transponder band passed to a particular receiver may be processed by the receiver so that a particular requested service (e.g., HBO, CNN, etc.) may be output by the receiver for presentation by a display device, such as the television 214c for example. In the example of FIG. 4, the intermediate frequency band used to transfer the respective bands 432a-h, 434a-h, and 436a-h to a particular receiver may have a width of about 1 GHz. Other examples are possible.

For example, it is contemplated that additional and/or variations on the example implementations discussed in connection with FIG. 4 are within the scope of the present disclosure. For example, and referring to FIG. 4, when the LNB 400 is configured such that only the port 406a a is active or activated, it is contemplated that a total of twenty-four distinct frequency bands each with a width of about 30 MHz may be created and output by the LNB 400 on the port 406a. Accordingly, each tuner of a particular twenty-four tuner receiver that is coupled to the port 406b via coaxial cable may request any frequency band from any one of the satellites 206a-c, and yet receive the frequency band in the frequency range for which a corresponding tuner has already been programmed. Still other examples are possible as well.

For example, it is contemplated that the LNB 400 may be configured so that it may function as a dual-band translation LNB with respect to sourcing channels containing programming on the port 406a, as a triple-band translation LNB with respect to sourcing channels containing programming on the port 406b, and as a channel-stacking LNB with respect to sourcing channels containing programming on the port 406c. In this manner, the LNB 400 may at least be configured to simultaneously source channels containing programming to three differently configured receivers according to a particular configuration of each respective receiver. Further, it will be appreciated that, in consideration of the example implementation or architecture of FIG. 4, nine distinct sourcing configurations may exist, and that aspects of the present disclosure may be extended to a particular field-programmable LNB having N output ports, where N is an arbitrary integer value.

TABLE 2

| RF Output Port | Output Format | Output Format | Output Format |
|---|---|---|---|
| Port 406a | Dual-band translation | <u>Triple-band translation</u> | Channel-stacking |
| Port 406b | Dual-band translation | Triple-band translation | <u>Channel-stacking</u> |
| Port 406c | <u>Dual-band translation</u> | Triple-band translation | Channel-stacking |

Table 2 above summarizes nine distinct sourcing configurations from the perspective of the ports 406a-c of the example architecture of the LNB 400 shown in FIG. 4. For example, in one configuration or arrangement, the LNB 400 may be configured so that it may function as a triple-band translation LNB with respect to sourcing channels containing programming on the port 406a (indicated by underlining in Table 2), as a channel-stacking translation LNB with respect to sourcing channels containing programming on the port 406b, and as a triple-band translation LNB with respect to sourcing channels containing programming on the port 406c. Other examples are possible. Further, with reference to Table 2, other distinct configurations in terms of content sourced on a particular one of ports 406a-c may exist when taken into account that one or more of the ports 406a-c may be deactivated or disabled so as to not exhibit any particular type of sourcing scheme.

As discussed throughout, the LNB 400 may be programmatically configured or reconfigured as desired so that the LNB 400 may source channels containing programming to any particular receiver according to a receive-specific hardware and/or firmware. Extending this to the example of FIG. 4, it is contemplated that a controller module 416 of the LNB 400 may access and run a particular file in response to a command signal 418 to program, reprogram, configure, reconfigure, etc., logic within at least the third stage 412 and the fourth stage 414 of the LNB 400 to modify or change the personality and/or functionality of the LNB 400 so that the LNB 400 may source channels containing programming to any particular receiver according to a receive-specific hardware and/or firmware.

While in FIG. 4 the command signal 418 signal is shown as being put to a bottom portion of the controller module 416, it is contemplated that the command signal 418 may be supplied to the LNB 400 over a physical or wireless connection, represented by connections 420a-c, where connection 420a may represent a communication connection between the controller module 416 of the LNB 400 and the PTR 210, for example as shown in FIG. 4. Other examples are possible. Further, other examples are possible where other stages or components of the LNB 400 may additionally or alternately be programmed in the response to the command signal 418, and further such programming may be based upon implementation-specific details. An example process or method, such as the method shown in FIG. 1, associated with programming or logic provided for by the channeling module 218 of the controller module 416 of the LNB 400 is discussed in further detail in the succeeding paragraphs.

Figure 5:
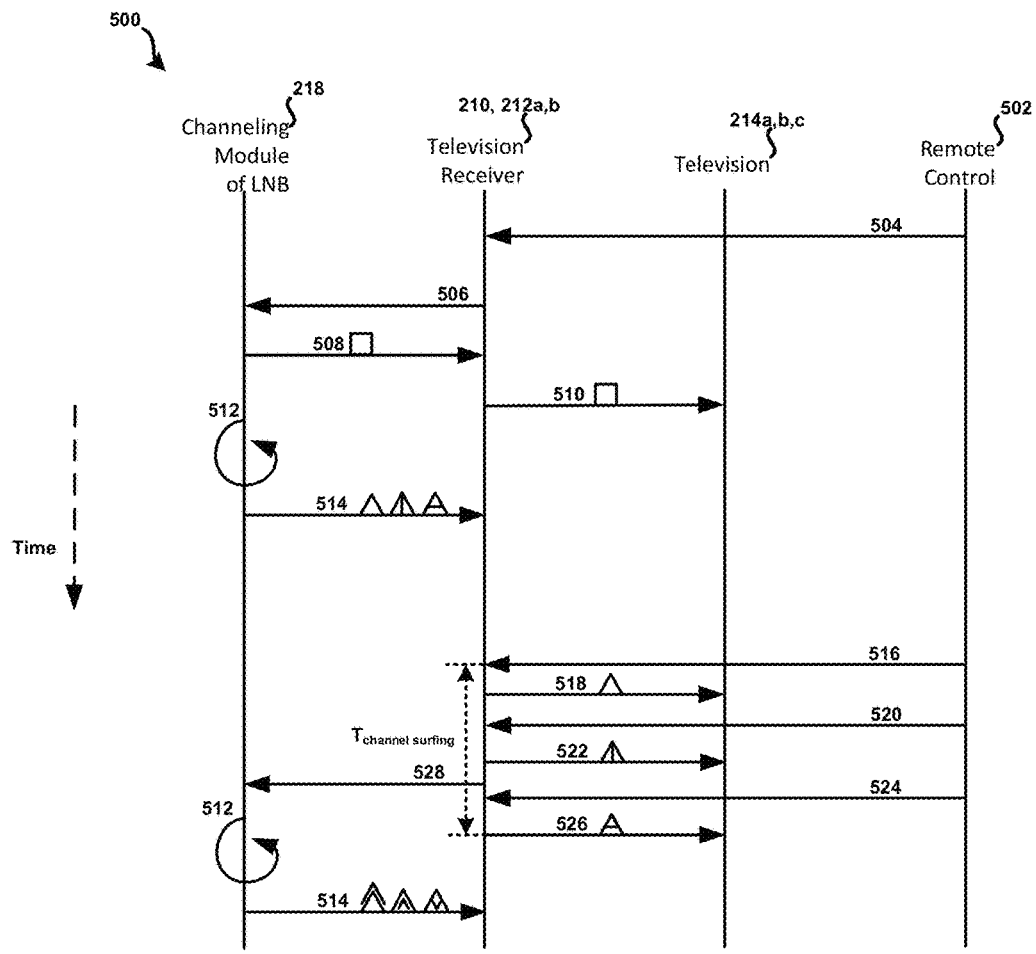
FIG. 5 illustrates a swim diagram of an embodiment of controlling channel selection at an LNB.

Referring now to FIG. 5, a swim diagram illustrates an example process 500 performed by the LNB 400 (having the channeling module 218) during interaction with the PTR 210, the television 214c, and a user input device such as a remote control 502. The remote control 502 may receive user input for selecting the first television channel. As such, the remote control 502 signals 504 to the PTR 210 to provide the first television channel. In response, the PTR 210 may request the first television channel from the LNB 400 with a signal 506, which may be directed to, or detected by, the channeling module 218 as shown in FIG. 5. The LNB 400 sources the channel in an output signal 508, which may similarly be detected by the channeling module 218 as shown. The PTR 210 prepares and outputs 510 the first television channel on the television 214c. It is noted that the PTR 210 and the television 214c may comprise an integral unit. Further, it is noted that the PTR 210 may not need to request the first television channel from the LNB 400 if an output signal containing the first television channel is already being streamed to the PTR 210. Nonetheless, the channeling module 218 monitors the activity of the PTR 210 and is apprised of the output 510.

Concurrently, or shortly after sourcing the output signal 508, the channeling module 218 performs a predictive sourcing process 512, such as the method 100 shown in FIG. 1. Upon determination of the additional television channels based on the prediction criteria as described above, the channeling module 218 may push 514 or source the additional television channels to the PTR 210. It is contemplated that the additional television channels, such as three additional channels as illustrated in FIG. 5, may be decoded and/or otherwise processed by the PTR 210 in anticipation of the user's future request. After a period of time, the user may begin to channel surf, as indicated by consecutive signals 516, 520, 524 delivered from the remote control 502 to the PTR 210. Here, the PTR 210 may quickly deliver the additional television channels 518, 522, 526. In this way, it is contemplated that the predictive channel sourcing method 100 may enable faster browsing through channels, among other benefits. Further, it is noted that this process 500 may not be limited to three additional channels and/or channel surfing, and that such aspects are shown only for illustration. Other examples are possible, as described throughout the disclosure.

In another aspect, the PTR 210 may signal 528 to the channeling module 218 that a channel surfing sequence is occurring. In another aspect, signal 528 represents a sensed or detected status of the PTR 210 by the channeling module 218. The signal 528 may occur at any time with a channel surfing time period, $T_{channel\ surfing}$. In response, the channeling module 218 may again implement the predictive channel source method 100 to predict additional channels to send to the PTR 210, such as three additional channels carried in a signal 514. It is contemplated that this process 500 may repeat during an entire television viewing period.

Further, it is noted that for satellite television distribution systems, television channels may be transmitted as portions of transponder streams from multiple transponders of multiple satellites. Depending on the television channel to be presented, the channeling module in the ODU may be required to provide programming from different satellites and/or source programming to different transponders of the television receiver. The delay time may be especially frustrating for the user if the user is repeatedly changing television channels, such as during "channel surfing," which is when a user is selecting consecutive television channels for viewing, such as by pressing a channel up or channel down button on a remote control. It is contemplated that the channeling module described herein may aid in enabling faster television channel changes by providing programming to certain resources of the television receiver, such as unused hardware of the receiver that may be used to tune to and/or decode the transmitted programming. Such programming may be one or more television channels that are predicted, by the channeling module in the ODU, to be possibly desired by the user in the future. Although not so limited, an appreciation of the various aspects of the present disclosure may be gained from the following discussion in connection with the drawings.

In another aspect, the channeling module may be configured to send multiple television channels at a given time to a television receiver that may be equipped with multiple tuners and/or decoder hardware capable of receiving and decoding multiple television channels at a given time. In this way, it is contemplated that, while a particular television channel is being watched by the user, another television channel may be watched (e.g., using another television or via picture-in-picture) or recorded (e.g., using a digital video recorder (DVR) of the set top box). For example, the channeling module may communicate with a television receiver that serves the television needs of an entire household, whereby the receiver may have eight tuners and decoding resources sufficient to simultaneously receive and decode eight different television channels. Still other benefits and/or advantages are possible as well, and an appreciation of such benefits and/or advantages may be understood in light of the present disclosure in its entirety.

Figure 6:
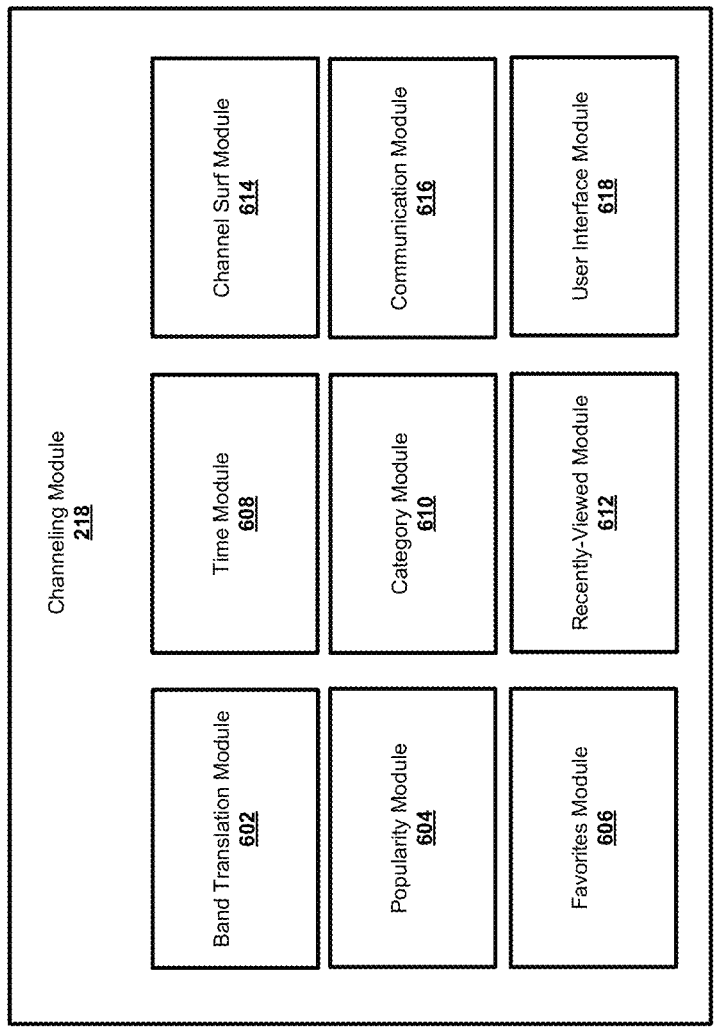
FIG. 6 illustrates an embodiment of a channeling module.

Turning now to FIG. 6, the channeling module 218 may be comprised of various submodules, herein referred to as modules, or components as shown. It is contemplated that the channeling module 218 may be provided in the controller module 416 of the LNB 400 as described above in reference to FIG. 4. In other aspects, the channeling module 218 or various components thereof may be provided in the PTR 210, such as in the storage medium 308 as shown in FIG. 3 above. Merely by way of example, the channeling module 218 in the LNB 400 may provide different modules than the channeling module 218 provided in the PTR 210. In another aspect, the channeling module 218 in the LNB 400 and the PTR 210 comprise the same components and functionalities, and may serve as back-ups for one another upon a detected failure, storage memory constraints, and/or situations that may arise.

As shown in FIG. 6, a band translation module 602 may be provided for identifying a particular configuration of at least one receiver that is coupled to the LNB 400, accessing files containing instructions to reprogram the LNB 400 according to the receiver configuration, and modifying LNB logic based on instructions within the files. For example, a particular configuration of the PTR 210 may be identified or determined by the band translation module 602 in response to detection of connection of the LNB 400 to the PTR 210. For example, in a "plug-and-play" type scenario, the LNB 400 and/or PTR 210 may detect a connection being established between the LNB 400 and PTR 210 when a first end of a coaxial cable is initially coupled to the PTR 210, a second end of the coaxial cable being already connected to the LNB 400. Other examples are possible. For example, a particular configuration of the PTR 210 may be identified or determined by the band translation module 602 in response to detection of an instruction received by one of the PTR 210 and LNB 400 based on user-input to identify the particular configuration. For example, an individual using the computing device 216a of FIG. 2 may establish a communication link between the computing device 216a and one of the PTR 210 and LNB 400, and initiate a command (e.g., hitting "enter") to instantiate a communication sequence between the PTR 210 and LNB 400 so that the LNB 400 may determine or identify a particular configuration of the PTR 210. Other examples are possible.

In a similar implementation, the band translation module 602 may program or reprogram the LNB 400 so that output signals provided by the LNB 400 to the PTR 210 over the coaxial cable are formatted according to a polarity band granularity filtering mode or a transponder band granularity filtering mode. In this example, the polarity band granularity filtering mode may correspond to filtering incoming signals from the satellites 206a-c at the polarity band level, where in one example a polarity band is about 500 MHz in band width. Other examples are possible. The transponder band granularity filtering mode may correspond to filtering incoming signals from the satellites 206a-c at the transponder band level, where in one example a transponder band is about 30 MHz in band width. Other examples are possible.

It is contemplated that the band translation module 602 may represent a paradigm shift with respect to LNB design, as typically a specific LNB sourcing scheme is implemented in or as hardware. In contrast, the band translation module 602 provides for an LNB 400 that is field-programmable and may take on or assume any particular personality so that the LNB 400 may source channels containing programming to any particular receiver according to the receiver-specific configuration. It is contemplated that there are a number of benefits and/or advantages associated with such an implementation in addition to those mentioned above.

For example, it is contemplated that the number "truck rolls" per arbitrary unit of time may be significantly reduced, or the need to have a service vehicle and technician be deployed to a particular customer location. For example, once a particular LNB configured in a manner consistent with the LNB 400 is installed, a television receiver or set-top-box, possibly as an upgrade, may be shipped to a customer or customer location, and then the customer may visit certain instructions to hook-up the television receiver. As part of a discovery process, the LNB may determine type, model, etc., of the television receiver and then reconfigure itself so as to be compatible with the television receiver. It will be appreciated that in such an implementation a significant savings may be realized in terms of financial considerations, also while allowing for certain resources (equipment, human, etc.) to be allocated or reallocated to other functions. Also, inventory and supply chain management may be simplified as older LNBs are phased-out and replaced with an LNB configured in a manner consistent with the LNB 400. This is because it may only be needed to stock one type of LNB as opposed to multiple types of application-specific LNBs. Also, economies of scale in manufacturing may be realized when only a single type of LNB is produced.

As further shown in FIG. 6, the channeling module 218 may further include various modules for selecting one or more television channels (other than a first television channel already being output for presentation) based on prediction criteria. For example, a channel popularity module 604 may be provided to determine prediction criteria based on popularity of television channels. Merely by way of example, the popularity module 604 may periodically receive popularity information about various television channels from the service provider 202. This popularity information may be for particular time periods corresponding to particular television programs. This system-wide popularity information, which may be based on usage data gathered from multiple television receivers operated by different users and compiled by the service provider 202, may be used by the popularity module 604 to create prediction criteria that indicate television channels considered likely to be selected by the user for presentation based on this system-wide popularity. If the first television channel already output by the user's PTR 210 and/or already being sourced by the LNB 400 is one of the television channels indicated to be the most popular by the system-wide popularity information, this television channel may be skipped in favor of the next most popular television channel (as such the first television channel may be prevented from being selected and sourced to the PTR 210 twice). Depending on the number of tuners and audio/video decoding resources available, the number of television channels selected using the prediction criteria may be varied accordingly.

As further shown in FIG. 6, a favorites channel module 606 may be provided to handle a listing of favorite channels received from the user. The favorites channel module 606 may store this listing of favorite channels. Prediction criteria may be created by the favorites channel module 606 based on these user-selected favorite television channels, which may originally be input by the user into the PTR 210, the computing device 216*a*, and/or any other device and sent by the device to the channeling module 218. Depending on the number of tuners and audio/video decoding resources available, as indicated by the PTR 210 to the channeling module 218 and/or detected by the channeling module 218, the number of television channels selected using the prediction criteria may be varied. If the first television channel is one of the television channels indicated as a user-favorite, this first television channel may be skipped in favor of another user-favorite television channel (as such the first television channel may be prevented from being selected and sourced to the PTR 210 twice).

FIG. 6 further shows a time module 608 that may monitor the amount of time television channels are presented and/or recorded by the PTR 210. For instance, the PTR 210 may signal to the time module 608, upon request or automatically, certain channels that are presented and/or recorded. In another example, the time module 608 tracks the channels that are sourced to and/or requested by the PTR 210. Either way, a table, or some other storage arrangement, may be maintained by the time module 608 that indicates the most requested television channels at the PTR 210. The time module 608 may generate prediction criteria based on the amount of time each television channel is presented and/or recorded at the PTR 210. As such, the most watched and/or the most recorded television channels may be selected as the one or more television channels. Depending on the number of tuners and audio/video decoding resources available, the number of television channels selected using the prediction criteria may be varied accordingly. If the first television channel is one of the television channels indicated as most watched and/or recorded using the television receiver, this television channel may be skipped in favor of the next most popular television channel (as such the first television channel may be prevented from being selected and sourced to the PTR 210 twice).

Still further, as shown in FIG. 6, a category module 610 may be provided to determine and/or track a category of the first television channel being output by the PTR 210, and/or requested by the PTR 210, and/or based on user-input of category preferences. The category may be based on the television channel or the particular programming being currently shown on the television channel. For example, the category may be: sports, news, movies, drama, shopping, travel, food, music, reality TV, etc. The category module 610 may generate prediction criteria that indicate television channels of the same or related category. Such an arrangement may be useful because if a user is watching a television program within a particular category, the user may be more likely to switch to another television channel carrying content in the same category, e.g. the PTR 210 may be more likely to request the similar television program. For example, the user may be likely to switch between football games appearing on different television channels. Depending on the number of tuners and audio/video decoding resources available, the number of television channels selected using the prediction criteria may be varied accordingly.

Referring yet again to FIG. 6, a recently-viewed module 612 may be provided to create prediction criteria based on the most recently viewed television channels. Such recently-viewed television channels may be communicated from the PTR 210 to the channeling module 218. For example, many remote controls associated with television receivers have a "recall" or "last channel" button. A user may be likely to switch back to the most recent or previously presented television channel. As such, one or more previously presented television channels may be used for prediction criteria to select the one or more television channels.

FIG. 6 further shows a channel surf module 614, which may create prediction criteria based on the user's use of a "channel up" or "channel down" command at the PTR 210, such as by pushing associated buttons on a remote control. Such commands may be communicated to the channel surf module 614 by indication from the PTR 210 to the channeling module 218, automatically and/or upon request by the channeling module 218, and/or as detected by the channeling module 218.

Still further, FIG. 6 illustrates a channel surf module 614 that may facilitate preparation of one or more television channels for presentation and/or sourcing during channel surfing, such as when the user is flipping through consecutive channels. The channel surf module 614 may detect, upon receiving a signal from the PTR 210 and/or monitoring source channels that are being requested by the PTR 210, a situation where the user provides "channel up" commands. Similarly, the channel surf module 614 may respond to "channel down" commands. It is noted that while a user channel surfs by using channel up and channel down commands, it should be understood that the prediction criteria generated by the channel surf module 614 may additionally or alternatively be used to select some or all of the one or more television channels.

The channel surf module 614 may receive or detect a first "channel up" command input by the user at the PTR 210. This command may be received based on a user pressing a "channel up" button on a remote control in communication with the PTR 210. In another aspect, the channel surf module 614 may detect that a tuner of the PTR 210 is tuned to a first television channel in response to the "channel up" command. This first television channel may have a channel number that is the next greater available television channel from the previously tuned to television channel. For instance, if television channel number 26 was previously selected for presentation, the channel up command may result in channel number 27 being selected. The channel surf module 614 may detect that the PTR 210 assigns a tuner of the PTR 210 to tune to and/or request from the LNB 400 a transponder stream that contains the first television channel. As previously detailed in relation to FIG. 2, using a network information table and/or one or more other related stored tables, the PTR 210 and/or the channeling module 218 may be able to determine a proper transponder stream for which tuning is required and the data packets within the transponder stream corresponding to the television channel based on PIDs. If two television channels have consecutive television channel numbers, in a satellite television distribution network, these television channels may not necessarily be part of the same transponder stream and may be transmitted using different transponders and/or satellites. In the instance of a satellite-based television system, the television receiver may use a network information table (NIT) to determine a proper satellite and/or transponder to which tuning is required to receive the transponder stream that contains the first television channel. Tuning to a particular transponder stream may involve the use of a single tuner. As such, if multiple television channels are desired to be presented and/or recorded from a single transponder stream, only a single tuner may be necessary to receive the transponder stream. If the first television channel is being output for presentation to a presentation device, such as a television, an audio/video decoding module (such as one of the audio/video decoding submodules of FIG. 2) may receive (descrambled) video/audio data packets that were received by the tuner and may convert the descrambled video/audio data packets to a format appropriate to be output to a presentation device. For instance, this may involve conversion from an MPEG format (or some other compressed video/audio format) to a format appropriate for output to a presentation device.

Further, the channel surf module 614 may detect that one or more tuners of the PTR 210 are idle. While a tuner may be assigned to tuning to the transponder stream containing a first television channel, other tuners of the PTR 210 may be idle. Additionally or alternatively, the availability of audio/video decoding resources may also be detected by the channel surf module 614 based on signals received by the channeling module 218 from the PTR 210.

The channel surf module 614 may detect that one or more television channels (other than the first channel already being output for presentation) are selected. Since a "channel up" command was received previously, the television channels selected may be sequential television channels having immediately greater television channel numbers than the first television channel. As an example, if a channel up command is received that results in the first channel being television channel number 27, idle tuners may be assigned to television channel numbers 28, 29, and 30. The channel surf module 614 may further detect that in some examples, television channels unavailable to the PTR 210 are skipped. In examples involving a "channel down" command being detected by the channel surf module 614, the television channels selected may be sequential television channels having immediately lower television channel numbers than the channel number of the first television channel.

The number of television channels selected may be based on the number of tuners that were identified as idle by the channel surf module 614. For example, if three tuners were identified as idle, then three television channels may be selected by the channel surf module 614 for predictive sourcing; if one television tuner was identified as idle, then a single television channel may be selected for predictive sourcing. If no idle television tuners are available, then no channels may be selected for predictive sourcing. In some examples, the number of audio/video decoder submodules available for use in decoding may additionally or alternatively be used to determine the number of television channels that are prepared for viewing and/or sourced by the channeling module 218 of the LNB 400. In some examples, whichever module has less idle time will serve as the limiting factor for the number of television channels selected by the channel surf module 614. For example, if four tuners are detected as idle but only two audio/video decoder submodules are detected as idle, then only two television channels may be selected and/or sourced to the PTR 210.

Further, each of the idle tuners identified by the channel surf module 614 may tune to a television channel of the one or more sequential television channels selected. Accordingly, the channeling module 218 may instruct the LNB 400 to source the selected channels to the PTR 210. Furthermore, it is contemplated that each tuner previously identified as idle may tune to a different television channel of the one or more television channels. If more than one of the television channels are transmitted to the PTR 210 as part of the same transponder stream, only a single tuner may be needed to tune to the transponder stream.

Further, it is contemplated that each of the one or more television channels tuned to by the PTR 210 and sourced by the LNB 400 according to the channeling module 218 may be decoded at the PTR 210. This decoding may use audio/video decoding resources, which may be implemented in the PTR 210 as individual hardware-based audio/video decoding integrated circuits (ICs) or as a single hardware-based audio/video decoding IC which can handle multiple television channels on a time division basis. Such decoding may involve decoding from an MPEG format, or any other format sent by the LNB 400, to a format appropriate for output to a presentation device.

Even further, it is contemplated that the output from the audio/video decoder submodule performing such decoding functions may be discarded by the PTR 210. Such discarding may continue until the user selects one of the television channels of the one or more television channels for presentation. This selection may occur if the user again provides a "channel up" command. Once selected, the output from the audio/video decoder submodule of at least one of the one or more television channels may no longer be discarded but may rather be output to the presentation device for viewing by the user. If the user never selects a particular television channel of the one or more television channels, none of the output from the audio/video decoder submodule decoding the television channel may be presented, stored, or otherwise output by the television receiver.

In another aspect, the channel surf module 614 may detect that a second "channel up" command is initiated and/or received. This command may be received based on a user pressing a "channel up" button on a remote control in communication with the PTR 210. Since the one or more channels are sequential and immediately greater than the first television channel, the television channel selected based on the user's command is one of the one or more television channels. The television channel was already sourced by the LNB 400 for presentation and the PTR 210 may have already tuned to the appropriate transponder stream and performed any necessary decryption (of ECMs), descrambling (using CWs obtained from the ECMs), and decoding the audio/video packets of the television channel. As such, at least one I-frame may have already been received and decoded. Such decoding which occurred before the second channel up command was received may be used for presentation of the now selected television channel. Accordingly, output of the decoded television channel to a presentation device occurs sooner than if the television channel indicated by the second "channel up" command was tuned to and decoded after receiving the command.

It is contemplated that, with the channel surf module 614, the channeling module 218 may continuously prepare the LNB 400 for another "channel up" or "channel down" command. Since changing to outputting the second television channel, the tuner used to tune to the first television channel may now be idle. This tuner may now be assigned to tune to the next sequential television channel not already tuned to. The assignment of tuners may be detected by the channel surf module 614. Other examples may be possible.

It is contemplated that there are various ways of determining prediction criteria by the channeling module 218 that are used to select one or more television channels, as described above. The various ways for determining prediction criteria may be used individually or in various combinations. Merely by way of example, if the channeling module 218 detects that three idle tuners at the PTR 210 are present, then the channeling module 218 may source two idle tuners with popular channels determined by the popularity module 604, while one tuner is used for the recently-viewed channel determined by the recently-viewed module 612. As should be understood, many other variations and combinations of the various ways for determining prediction criteria may be used.

Further, as shown in FIG. 6, the channeling module 218 may comprise a communication module 616. Merely by way of example, the communication module 616 may be configured to send and/or receive signals or data to and from the channeling module 218. For instance, the communication module 616 may instruct the LNB 400 to output a particular predicted source channel to the PTR 210. In another aspect, the channeling module 218 may be configured to receive signals from the PTR 210, such as signals indicating which television channels are currently displayed and/or being recorded at the PTR 210. In one aspect, the communication module 616 may receive such data and/or signals from the PTR 210 and provide them to other submodules of the channeling module 218 for further processing and/or determination of band translation schematics and prediction criteria. In that case, it is noted that the channeling module 218 is provided in the LNB 400 as shown in FIG. 4, and/or more particularly, in the controller module 416 of the LNB 400 to manage the predicted source channels prior to transmitting the source channels to the PTR 210.

Still, in other aspects, the channeling module 218 may provide a user interface module 618 that is configured to interact and receive instructions or preferences from the user. The user interface module 618 may receive user input, directly and/or indirectly, such as through the PTR 210, on one or more aspects of the predictive channel sourcing provided by the channeling module 218.

Figure 7:
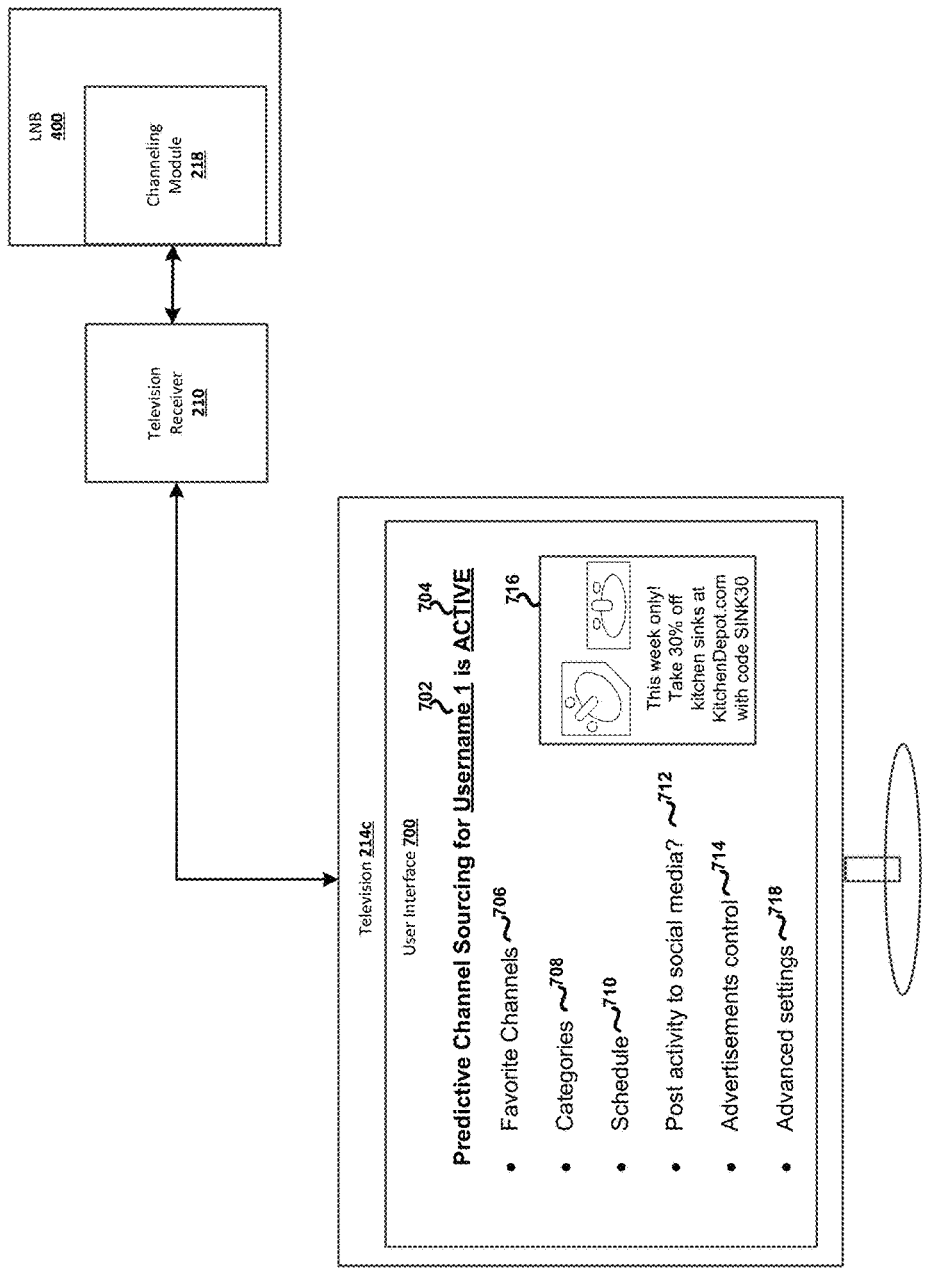
FIG. 7 illustrates an embodiment of a user interface.

Turning now to FIG. 7, an example user interface 700 that may be provided for by the user interface module 618 of FIG. 6 is illustrated. The user interface 700 may indicate a user profile 702 of the predictive channel sourcing service and whether the service is currently activated or deactivated 704. For instance, as shown in FIG. 7, the user profile shown is "Username 1" and the service is "Active" for that user. It is contemplated that a user may click on the underlined user profile 702 and select a different user. For instance, a pop-up window or drag-down box may appear upon selecting and clicking username 702 and the user may highlight a new username, or enter a new username to create a new user profile. Similarly, the user may hover over and click on "ACTIVE" 704 to toggle on and off the predictive channel sourcing service.

In another aspect, the user interface 700 provides a listing of menu items that the user may click on and enter various user preferences. For instance, the user may click on a favorite channels 706 option that allows the user to populate a list of favorite channels associated with the username. The list of favorite channels may be utilized by the favorites channel module 606 of the channeling module 218 for generating predictive criteria and determining which channels to source to the PTR 210. In another aspect, the user may enter channels to avoid or omit from the predictive channel sourcing. Furthermore, the user may prioritize particular favorite channels, specific shows, and/or episodes. For instance, if a first favorite television show is playing and a second favorite television show is playing that is more preferred than the first show, then the television channel carrying the second favorite show may be sourced by the channeling module 218 instead of, or prior to, sourcing the first favorite show to the PTR 210.

The user interface 700 may further provide a categories option 708 that receives user input on preferred genres, such as action, romance, comedy, foreign, news, sports, music, culinary, and so on. Furthermore, the categories option 708 may permit ranking of the genres. For instance, at any time, if two channels may be predictively sourced but the detected resources of the PTR 210 indicate that only one channel may be supported at that time, then the category module 610 may give a higher priority to the one of the two channels that falls within a higher-prioritized genre. Still, the categories option 708 may permit the user to identify specific categories to avoid or omit.

Further, a schedule option 710 may be provided to allow the user to specify time periods or active/inactive status of the predictive channel sourcing. For instance, the user may choose the service to be off during afternoons, or from 3 pm-5 pm, and so on. Further, the user may select a time of day for implementation of a particular user profile. For instance, if user 1 is typically watching television from 9-11 pm on weeknights, then user 1 can select to automatically activate his or her user profile during those time slots and thus automatically deactivate any other user profile. In another aspect, the schedule option 710 may allow the user to select which predictive criteria to implement at a specific time of day. Merely by way of example, the user may select to implement the category module for weekends so that the predictive channel sourcing is directed to action movies, yet the favorites channel module 606 may be set for implementation on the weekdays.

In another aspect, the user interface 700 provides an option to post activities to social media 712. For instance, the channeling module 218 may detect if a user is viewing a particular television channel, perhaps for a predetermined length of time, and broadcast the television channel to an internet-related webpage or other social media tool or account of the user. The channeling module 218 may further broadcast to various forms of social media that the particular television channel was discovered by the user through the service provider's predictive channel sourcing method. The social media 712 may broadcast a particular channel or a particular show that is being output for viewing by the user.

The user interface 700 may further include an advertisements control 714 option. The advertisements control 714 may allow the user to turn on or off advertisements that may be provided in an advertisement box 716 on the user interface 700 and/or in other displays, such as an electronic program guide EPG. Furthermore, the user may determine if the advertisements may be related to the content being viewed, or listed in the favorites 706 and/or categories option 708 options. Merely by way of example, an advertisement for a user indicating home remodeling as a preferred category may receive a discount and/or link for purchasing home remodeling related goods, as illustrated in the advertisement box 716 of FIG. 7.

In further aspects, the user interface 700 may include an advanced settings 718 option to receive further user preferences and/or instructions. For instance, the user may select which prediction criteria to implement and/or avoid. For instance, based on the user's selection, the channeling module 218 may implement the favorites channel module 606 and the category module 610 only. In another aspect, the user may implement the channel surf module 614 only. In a different aspect, the advanced settings 718 option may permit the user to link an external device, such as a smart phone or tablet, to the PTR 210 and thus permit viewing of channels and the user interface 700 there through.

In another aspect of the embodiments, various advantages can be realized by buffering certain data transmitted by a television service provider to television receivers via transponder streams. As detailed in relation to FIG. 3, a transponder stream, relayed by a satellite to a tuner of a television receiver, can be a packetized serial data stream. Packets within the data stream correspond to multiple television channels. For each television channel, audio packets and video packets are transmitted, each having a particular packet identifier (PID) that is used by the television receiver to determine which packets correspond to which television channels and whether the packets are audio, video, or some other form of data. In addition to packetized video and audio data, other information is transmitted in packet form having different PIDs. For instance, encryption keys, which can be in the form of entitlement control messages (ECMs), can be included on a transponder stream for the television channels that are also transmitted on the transponder stream. Such ECMs may be decrypted to obtain one or more control words (CWs) or other types of descrambling keys, which are in turn used to descramble the audio and video packets. ECMs, and thus CWs, can be specific to a television channel or may be used across multiple (e.g., all) television channels present on a particular transponder.

Conventionally, since a television channel's ECM is only transmitted on the same transponder stream on which the television channel is transmitted, and such an ECM is only transmitted periodically, when a tuner of a television receiver tunes to the transponder stream of a television channel, a delay may be present between when the tuner begins receiving the transponder's serial data stream and when the desired television channel's ECM is received for the first time. In some embodiments, on the transponder stream, the ECM may be transmitted every 250 ms. Therefore, worst case, after tuning to the transponder stream, it may be approximately 250 ms before the television receiver acquires the necessary ECM for use in descrambling the television channel's video and audio packets. This delay, especially when compounded with other delays involved in tuning, acquiring, decrypting, decoding, and outputting television channels received via a satellite television system, can be significant from a user's point-of-view, especially if the user frequently channel hops. Availability of the initial ECM for decoding of a television channel can be increased by using the advance decryption key acquisition aspects detailed below.

Figure 8:
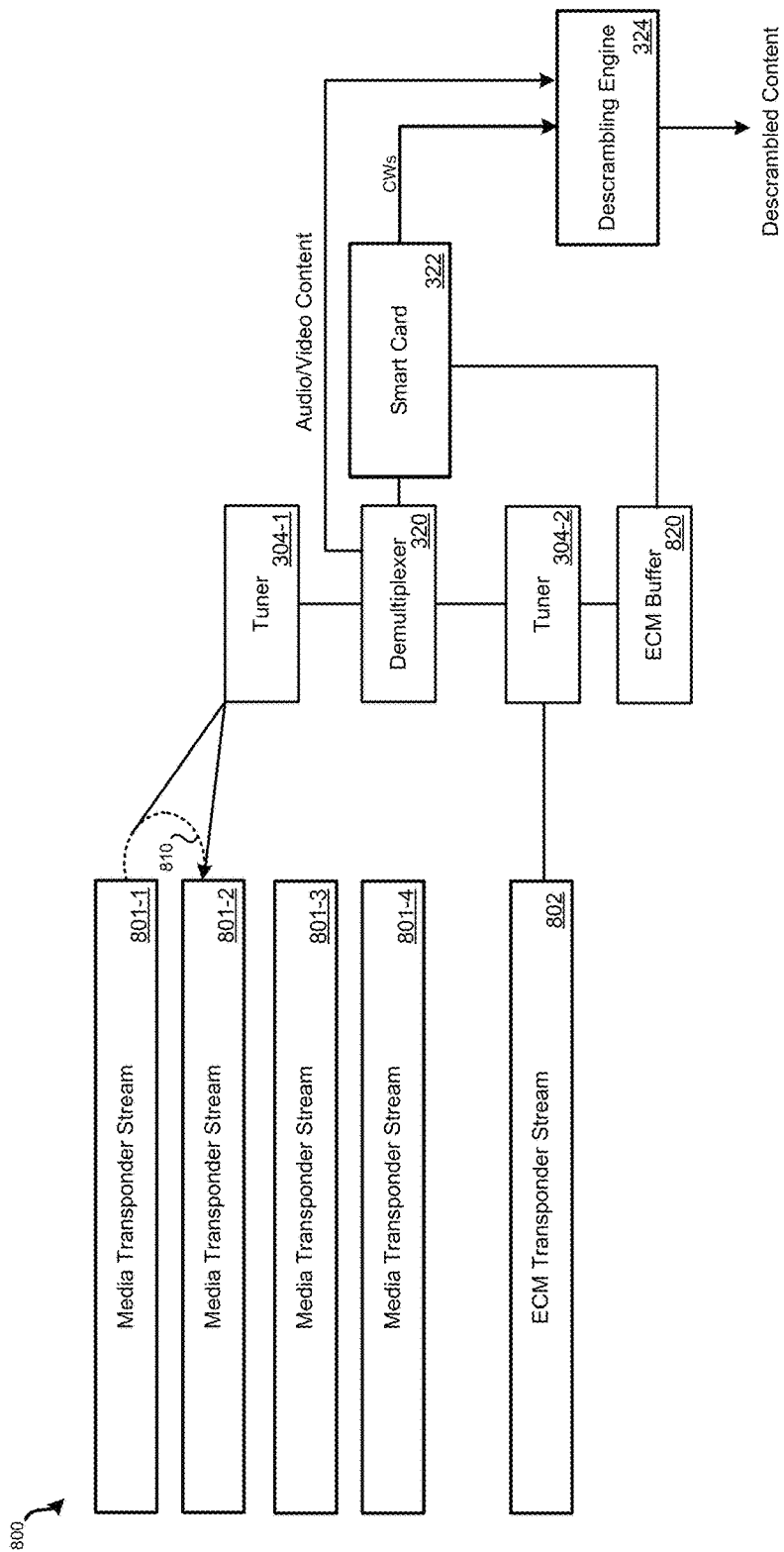
FIG. 8 illustrates an embodiment of a television receiver system for buffering ECMs, using an ECM transponder stream.

FIG. 8 illustrates an embodiment of a television receiver system 800 for buffering ECMs using an ECM transponder stream. Television receiver system 800 illustrates a portion of television receiver 300. It should be understood that television receiver system 800 can be incorporated as part of television receiver 300 of FIG. 3 or some other form of television receiver for buffering ECMs or some other form of decryption key in advance of tuning to the transponder stream corresponding to the decryption key.

Media transponder streams 801 (801-1, 801-2, 801-3, and 801-4) represent four exemplary transponder streams that are transmitted to a television receiver via one or more than one satellite. Media transponder streams may be transmitted on different frequency bands, thus a tuner of a television receiver may be able to tune to a single media transponder stream of media transponder streams 801 at once. Each media transponder stream may include packetized video and audio for multiple television channels. In some embodiments, each media transponder stream also includes decryption key packets (e.g., ECM packets) that are specific to only the television channels carried by that particular media transponder stream. Therefore, for example, if media transponder stream 801-1 includes packetized audio and video data for television channels 4, 5, 7, and 13, then if ECM packets are also included as part of media transponder stream 801-1, only ECM packets for television channels 4, 5, 7, and 13 would be present. In other embodiments, no ECM packets may be included as part of media transponder stream 801-1.

ECM transponder stream 802 refers to a transponder stream that is transmitted by the television service provider to television receivers using a separate frequency band than media transponder streams 801. ECM transponder stream 802 includes ECM packets (or, more generally, decryption key packets) that correspond to multiple television channels transmitted on multiple other media transport streams (e.g., 25 or more television channels that are transmitted via five or more transponder streams). Therefore, ECM transponder stream 802 carries ECM packets for each of the television channels present on media transponder streams 801. If media transponder streams 801 also carry ECM packets for the specific channels appearing on each media transponder stream, an ECM may be transmitted on two transponder streams. For example, if television channel 4 is on media transponder stream 801-3, ECM packets for audio and video packets of television channel 4 may be transmitted as part of ECM transponder stream 802 and media transponder stream 801-3.

In some embodiments, ECM transponder stream 802 may only carry ECM data. However, in other embodiments, additional data may be included on ECM transponder stream 802. For instance, audio and video packets for one or more television channels may also be transmitted as part of ECM transponder stream 802. In some embodiments, ECM transponder stream 802 carries ECMs for all television channels transmitted to the television receiver by the television service provider. In some embodiments, ECMs for only a subset of the television channels transmitted to the television receiver are carried by ECM transponder stream 802. ECMs may be transmitted in a particular pattern on ECM transponder stream 802. For instance, once an ECM has been transmitted for each television channel for which ECM transponder stream 802 carries ECMs, the pattern may repeat. Periodically, ECMs are updated such that the CWs, or other data obtained from the decryption key packets, change.

In some embodiments, ECM transponder stream 802 may only carry a particular ECM for a television channel a single time until the ECM changes. Therefore, if the ECM is changed by the television service provider once every 15 seconds, the ECM for a particular television channel may only be transmitted once every 15 seconds on ECM transponder stream 802. This may save bandwidth while still ensuring that the most recent ECM is buffered by television receivers that are tuned to ECM transponder stream 802. In some embodiments, ECMs may be transmitted with the same, a greater, or a lower frequency on the individual media transponder streams.

Tuner 304-2, which is merely an exemplary tuner available from among tuners 304 (304-1, 304-2, 304-3, 304-4, 304-5, 304-6, 304-7, and 304-8) of FIG. 3, may tune to ECM transponder stream 802. ECMs for multiple channels (including those which are not currently being viewed by the user and which correspond to transponder streams to which no tuner of the television receiver is currently tuned) may be stored in ECM buffer 820. As such, once tuner 304-2 has been tuned to ECM transponder stream for a sufficient period of time (e.g., 1 second) ECM packets for many or even all of the television channels on media transponder streams 801 may be obtained. As the ECMs are changed, ECM buffer 820 may be updated such that the most recently received ECM for each television channel is stored. The ECMs may not be decrypted at this time but rather may be stored in the encrypted form in which they were transmitted. In other embodiments, the ECMs received by tuner 304-2 may be pushed to smart card 322 or some other controlled access device for decryption and then buffered by ECM buffer 820.

Tuner 304-1 is an exemplary tuner from among tuners 304 currently being used to receive and output a television channel for presentation via a display device. Tuner 304-1 is tuned to media transponder stream 801-1. The necessary ECMs for the television channel being output by descrambling engine 324 may be obtained directly from media transponder stream 801-1. Meanwhile, tuner 304-2 is obtaining ECMs for the television channels of media transponder streams 801-2, 801-3, and 801-4 from ECM transponder stream 802. As described in relation to FIG. 3, demultiplexer 320 has a filter configured for the television channel desired for output (or recording). Audio and video packets for the television channel from media transponder stream 801-1 are routed by demultiplexer 320 to descrambling engine 324. ECM packets for the television channel are routed to smart card 322 or some other form of decryption/conditional access device for decryption. Smart card 322 decrypts the ECM and outputs control words (or other forms of descrambling keys) to descrambling engine 324. The packetized video and audio data for the television channel are then descrambled and output for either recording or output to a display device.

For various reasons, tuner 304-1 may tune from media transponder stream 801-1 to another media transponder stream, such as media transponder stream 801-2 (as illustrated by retune arrow 810). This retuning may occur due to a user command (e.g., a user selecting a television channel for viewing that is transmitted as part of media transponder stream 801-2.

The ECM for the television channel on media transponder stream 801-2, to which tuner 304-1 is retuned, may initially be retrieved from ECM buffer 820. As such, the most recent version of the ECM is transmitted on ECM transponder stream 802 for the television channel on media transponder stream 801-2. The correct ECM from ECM buffer 820 may be supplied to smart card 322 for decryption. Time spent waiting for the ECM to be received on media transponder stream 801-2 itself is eliminated by instead retrieving the ECM from ECM buffer 820. In some instances, up to 50, 100, 150, 200, 250, 300, 350 ms or even longer may be saved by using such an ECM buffer.

Once the appropriate ECM from ECM Buffer 820 is supplied to smart card 322, decryption may proceed as previously described. Descrambling engine 324 may use the one or more output CWs (or other forms of descrambling keys) obtained from smart card 322 to descramble audio and video packets from the television channel on media transponder stream 801-2 sooner than if media transponder stream 801-2 had to be monitored until an appropriate ECM for the television channel was transmitted thereon. After the initial ECM for the television channel on media transponder stream 801-2 has been retrieved from ECM buffer 820, future ECMs for the television channel may be obtained from media transponder stream 801-2. Alternatively, ECM buffer 802 may continue to be accessed for ECMs for the television channel.

ECM buffer 820 may be maintained in various forms. For instance, ECM buffer 820 may be maintained in the form of a database or table that stores ECMs by their packet identifier (PID). When an ECM is to be retrieved from ECM buffer 820, ECM buffer 820 may be searched for the appropriate PID. The PID may be determined based on a table received from the television service provider that associates television channels with particular PIDs for audio, video, ECMs, and/or other data. If the matching PID is present, the ECM is retrieved from ECM buffer 802; if it is not present, the ECM may be retrieved from media transponder stream 801-2 when it is next broadcast as part of the transponder stream.

Throughout the tuning and retuning of tuner 304-1 (and/or any other tuners) to media transponder streams 801, tuner 304-2 may continue to receive and buffer ECMs from ECM transponder stream 802 such that ECMs will be available for any future retuning of tuner 304-1 to another transponder stream or any other tuner tuning to one of the transponder streams for which ECMs are buffered.

While FIG. 8 illustrates a single ECM transponder stream, it should be understood that multiple ECM transponder streams may be present, such as one ECM transponder stream for half of a television service provider's transmitted channels, and a second transponder stream for the other half of a television service provider's transmitted channels. In such embodiments, multiple tuners may be used to tune to such ECM streams and provide ECMs to ECM buffer 820. In some embodiments, which ECMs are included on ECM transponder stream 802 may be determined by the television service provider based on factors such as the associated television channels' popularity, likelihood of being tuned to, or other factors. Similarly, in other embodiments, greater or fewer numbers of media transponder streams may be present. In some embodiments, each satellite may have an ECM stream. Such ECM streams may include ECMs for all services on the satellite or the whole system, multi-satellite system. If each satellite relays an ECM stream for the entire system, the ECM streams on each satellite may essentially be copies of each other. Such an arrangement may be particularly useful such that there is redundancy in the system.

Figure 9:
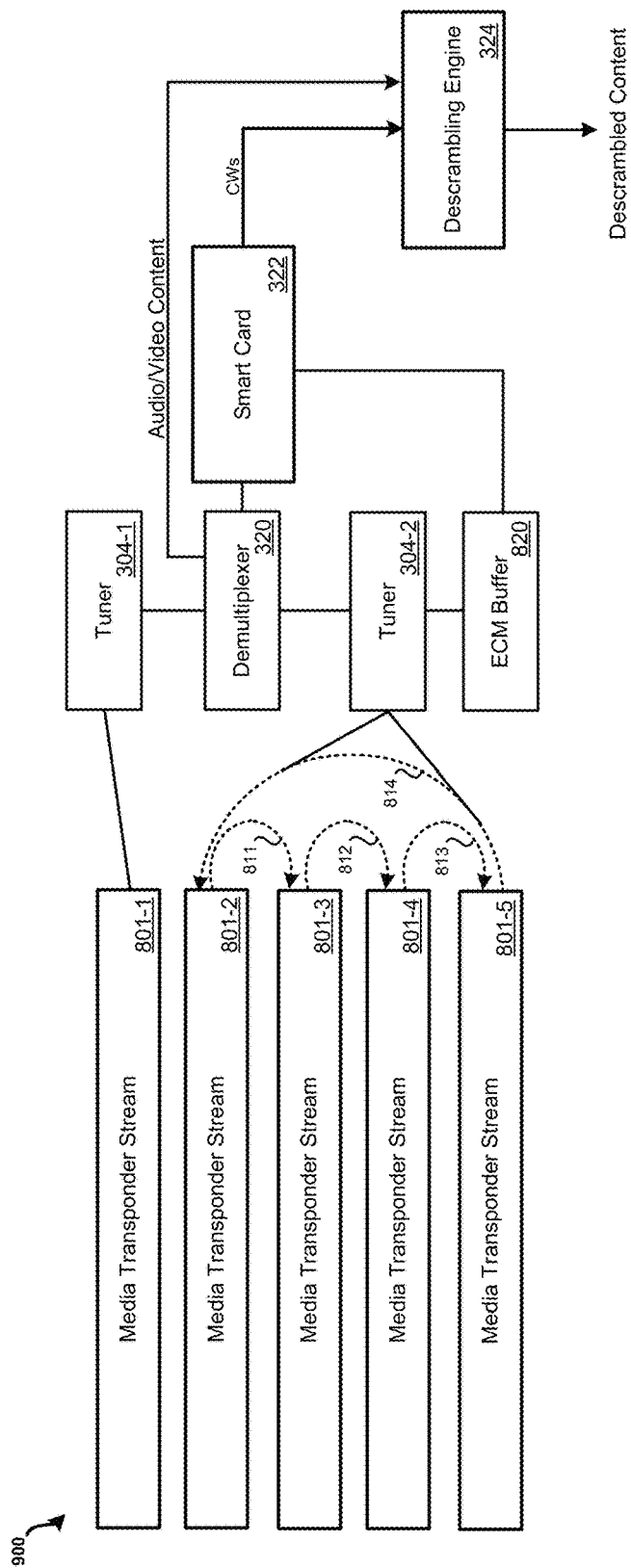
FIG. 9 illustrates an embodiment of a television receiver system for buffering ECMs, using a pattern-hopping tuner.

FIG. 9 illustrates an embodiment of a television receiver system 900 for buffering ECMs using a pattern-hopping tuner. In the embodiment of FIG. 9, rather than an ECM stream being transmitted by the television service provided, the television service provider transmits ECMs only on the media transponder streams that carry the television channels to which the ECMs correspond.

Rather than having a tuner parked on an ECM transponder stream to allow ECMs to be buffered for multiple media transponder streams, a tuner, such as tuner 304-2, may hop among various media transponder streams in a defined pattern to allow ECMs to be buffered. Since ECMs may be changed or updated no more often than a predefined period of time, such as every 15 seconds, each media transponder stream may only need to be tuned to at least as often as the predefined period of time to ensure that ECM buffer 820 is updated with the most recent versions of each channel's ECMs. In some embodiments, the ECMs on each transponder stream are transmitted by the service provider in a predefined pattern that is stored by the television receiver thus helping to minimize the amount of time spent waiting on each media transponder stream to receive the ECMs. For instance, while the amount of time between the transmission of ECMs on various transponder streams may be 15 seconds, the ECMs may be transmitted on a first transponder stream at to, ECMs may be transmitted on the second transponder stream at $t_0+1$ s, and ECMs may be transmitted on a third transponder stream at $t_0+2$ s. Therefore, if the television receiver has stored data indicating this pattern, it can tune to the first, second, and third transponder streams in order and receive the ECMs approximately a second apart (rather than waiting for up to the 15 second time period to elapse.

In system 900, a tuner, such as tuner 304-2 may hop among media transponder streams (e.g., media transponder streams to which another tuner of the television receiver is not already tuned and/or media transponder streams selected based on popularity, a user-defined list of favorites, transponder streams most likely to be tuned to due to a user's channel change pattern, or other factors such as detailed in relation to FIG. 6) in a predefined pattern. Tuner 304-2 may stay on each media transponder stream that is part of the pattern for a predefined period of time (e.g., 150 ms or 200 ms) or at least until each ECM for the television channels present on the media transponder stream are received and buffered. The pattern may be configured to have a maximum number of media transponder streams such that the ECMs buffered in ECM buffer 820 remain current. As a simple example, if tuner 304-2 can effectively tune to a media transponder stream and obtain the ECMs for the television channels present on that media transponder stream in 2 seconds and ECMs change for television channels every 15 seconds, tuner 304-2 may gather ECMs for buffering from seven media transponder streams.

In some embodiments, media transponder streams 801 may only carry a particular ECM for a television channel a single time until the ECM changes. Therefore, if the ECM is changed by the television service provider once every 15 seconds, the ECM for a particular television channel may only be transmitted once every 15 seconds on the corresponding media transponder stream. This may save bandwidth by reducing or eliminating repetitive instances of a same ECM being transmitted. Since a tuner may be used to buffer ECMs, despite the ECMs being transmitted relatively infrequently, the ECM needed when a channel change occurs may still likely be buffered by ECM buffer 820.

Retune arrows 811, 812, 813, and 814 illustrate an exemplary pattern which tuner 304-2 may be caused to tune by a processor, such as processors 302 of FIG. 3. This pattern may be continually repeated such that ECM buffer 820 contains current ECMs. If tuner 304-1 and/or any other tuner of the television receiver is returned, the tuning pattern of tuner 304-2 may be modified such that media transponder streams that are not currently being received by another tuner of the television receiver are tuned as part of the ECM-gathering pattern.

ECM buffer 820, while being updated in a different manner than in relation to FIG. 8, may be used similarly and may be organized similarly. Therefore, if tuner 304-1 tunes to another transponder stream, a buffered ECM, if available, in ECM buffer 820, may be used to decode received audio and video packets sooner than if smart card 322 needed to wait for the necessary ECM to be transmitted as part of the media transponder stream as received by tuner 304-1.

As a possible variation, each media transponder stream may carry ECMs for its own data at a first frequency, and ECMs for other transponders at a lower frequency. For instance, on media transponder stream 801-1, ECMs may be carried for the media of media transponder stream 801-1 at a first frequency (e.g., ECMs transmitted once every 2 seconds) and ECMs for some or all other transponder streams (e.g., of media transponder stream 801-2) at a second frequency (e.g., once every 15 seconds). As such, a single tuner, by receiving a particular transponder stream, can either fully or at least partially populate ECM buffer 820.

Figure 10:
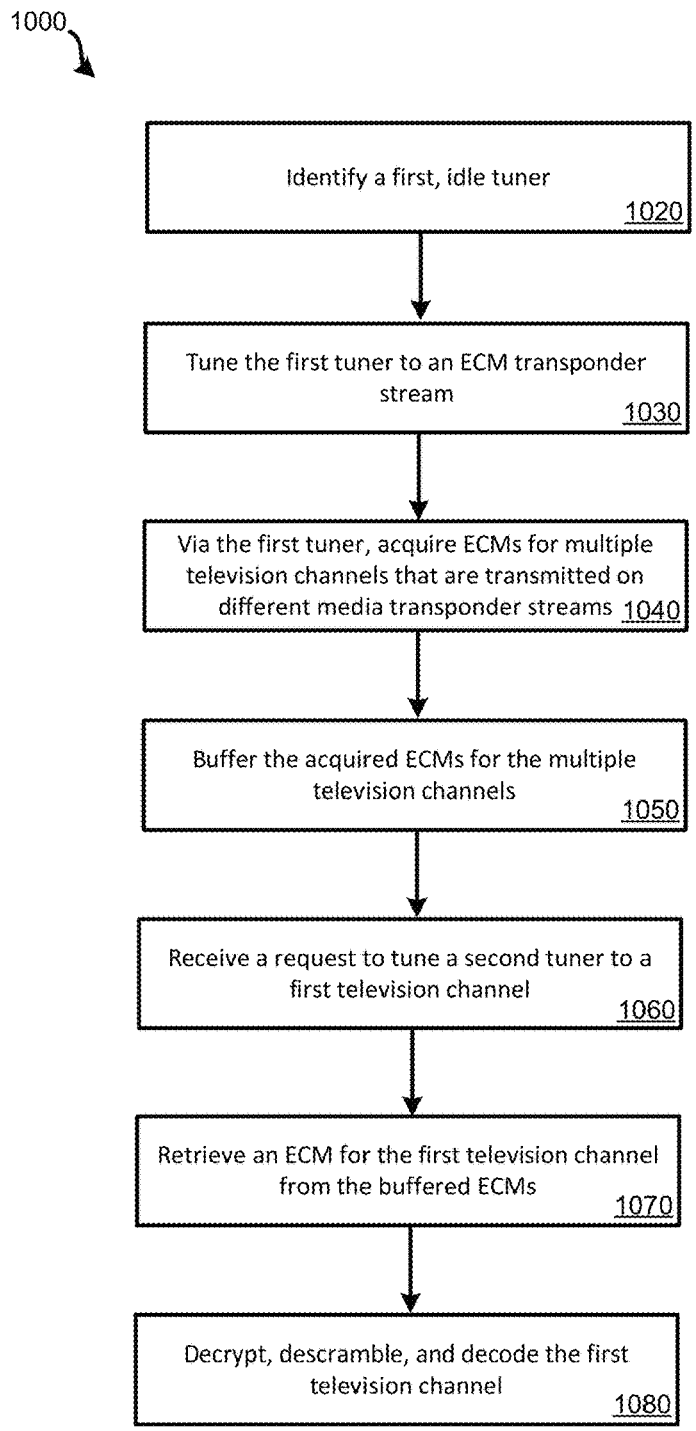
FIG. 10 illustrates an embodiment of a method for buffering ECMs, using a dedicated ECM transponder stream.

Various methods may be performed in relation to the systems of FIGS. 8 and 9. For instance, each step of the following methods may be performed using a television receiver that includes one or more of the systems of FIGS. 3, 8, and 9. FIG. 10 illustrates an embodiment of a method 1000 for buffering ECMs (or some other form of decryption key) using an ECM transponder stream. Method 1000 may be performed using the system of FIG. 3 which includes the system of FIG. 8.

At block 1020, a first, idle tuner may be identified. An idle tuner may be defined as a tuner that is not currently being used to receive a transponder stream for either recording of a television channel or output of a television channel to a display device. If no idle tuner is available, method 1000 may not be performed. Assuming an idle tuner is identified, block 1020 may proceed to block 1030. In some embodiments, rather than having to identify an idle tuner, a particular tuner may be tasked with and reserved for monitoring an ECM transponder stream.

At block 1030, the first tuner may be tuned to the ECM transponder stream. If the tuner is dedicated to being used for tuning to and receiving an ECM transponder stream, the tuner may be tuned to the ECM transponder stream when the television receiver is powered on. Otherwise, when a tuner is identified as idle, the tuner may be tuned to the ECM transponder stream.

Via the first tuner, ECMs may be acquired from the received ECM transponder stream at block 1040. The ECMs received on the ECM transponder stream may correspond to multiple television channels that are transmitted as part of multiple transponder streams. In some embodiments, the ECM transponder stream includes ECMs for all television channels that are transmitted to this television receiver by the television service provider. In other embodiments, the ECM transponder stream includes a percentage of the ECMs for television channels transmitted to the television receiver (e.g., at least 25% of ECMs for the transmitted television channels, at least 50%, at least 75%, etc.)

At block 1050, the ECMs acquired via the first tuner at block 1040 are buffered. These ECMs may be buffered to the ECM buffer as has been previously described. As the ECMs vary, as they are updated periodically, the buffered acquired ECMs may be updated such that the ECMs that are buffered are maintained up to date.

Alternatively, ECMs may be decrypted when received and the obtained CWs may be stored in the buffer. The following step, rather than retrieving an ECM from the buffer, would retrieve one or more CWs when requested. ECMs could be decrypted using the smart card and then re-encrypted using a session key and hardware encryption in order to keep decrypted CWs from being obtained by unauthorized personnel (e.g., hackers). When the re-encrypted CW are needed to be retrieved, these CWs could be decrypted using hardware other than a smartcard and thus could possibly be recovered faster than if the smartcard needed to decrypt from the ECM.

At block 1060, a request to tune to a particular first television channel may be received. This may involve another tuner, such as a second tuner, tuning to the transponder stream that carries the first television channel. This request may be based on user input provided via a remote control, such as a channel up command, channel down command, or user entering a particular channel number. This may involve tuning to a different transponder stream. In some embodiments, the request received at block 1060 involves tuning to the first television channel from another, second television channel.

At block 1070, the ECM for the first television channel is retrieved from the buffered ECMs that were buffered at block 1050. Therefore, rather than the ECM at block 1070 being obtained from the transponder stream which carries the television channel requested at block 1060, at least the initial ECM for use in decoding the first television channel is obtained from the buffered ECMs, that were buffered from the ECM transponder stream received by the first tuner.

At block 1080, the ECM retrieved from the buffered ECMs is decrypted to obtain one or more CWs or other descrambling keys. These one or more CWs, in turn, are used to the descramble audio and video packets of the first television channel. Once descrambled, these video and audio packets may be decoded from a compressed video format, such as MPEG, and output for presentation to a display device, such as a television. Future ECMs for the first television channel may be received on the media transponder stream on which the first television channel is received. Therefore, only the first ECM for decryption in decoding for the first television channel may be retrieved from the buffered ECMs; all subsequent ECMs may be obtained directly from the media transponder stream which carries the first television channel.

Figure 11:
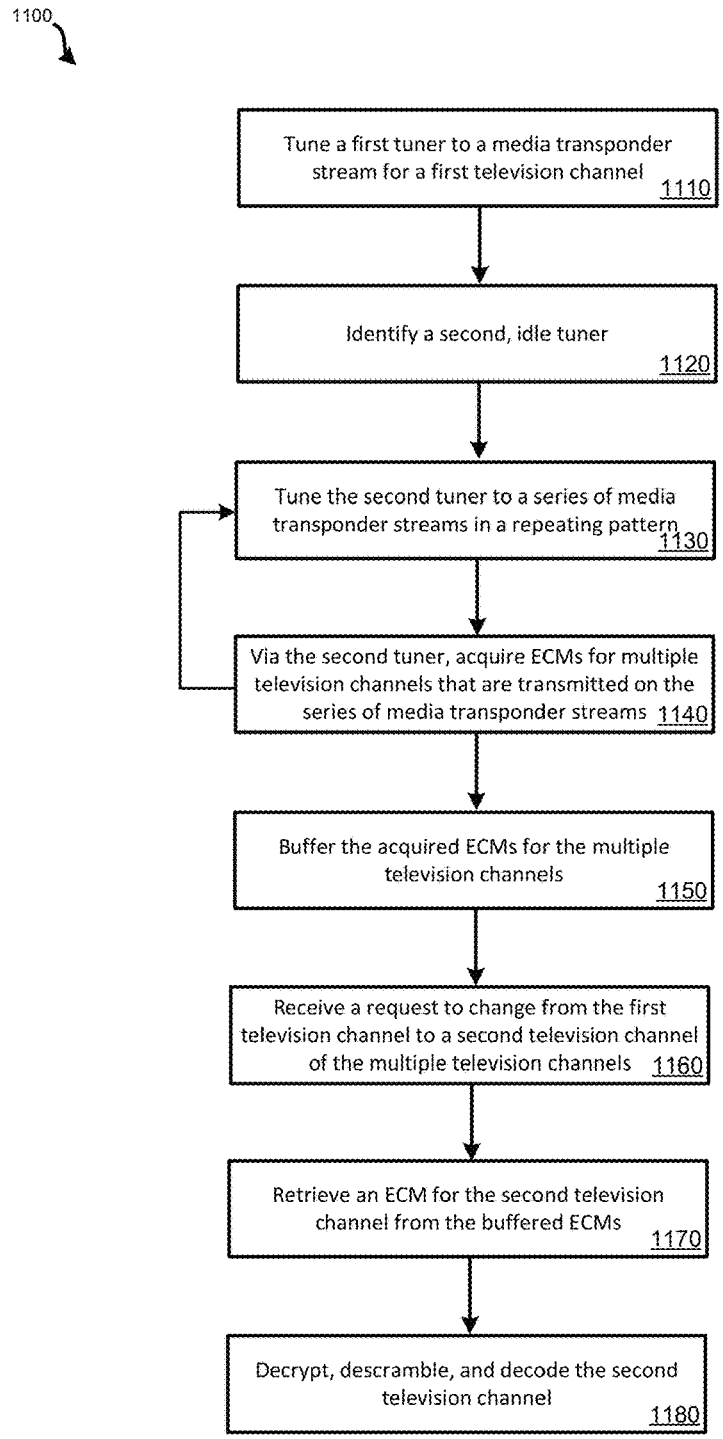
FIG. 11 illustrates an embodiment of a method for buffering ECMs, using a pattern-hopping tuner.

FIG. 11 illustrates an embodiment of a method 1100 for buffering ECMs using a pattern-hopping tuner. Method 1100 may be performed using the system of FIG. 3 which includes the system of FIG. 9. One possible advantage of using method 1100 is that it does not require an ECM transponder stream that carries ECMs for television channels transmitted on multiple transponder streams.

At block 1110, a first tuner may be tuned to a media transponder stream such that a first television channel is received. The first television channel may have been selected by a user or for some other reason.

At block 1120, a second, idle tuner may be identified. An idle tuner may be defined as a tuner that is not currently being used to receive a transponder stream for either recording of a television channel or output of a television channel to a display device. If no idle tuner is available, the remainder method 1100 may not be performed. Assuming an idle tuner is identified, block 1120 may proceed to block 1130. In some embodiments, rather than having to identify an idle tuner, a particular tuner may be dedicated to ECM acquisition through patterned transponder stream tuning.

At block 1130, the second tuner may be tuned to a series of media transponder streams to obtain the ECMs that correspond to the television channels on such media transponder streams. Therefore, in a repeating pattern to account for periodic changes in each television channels ECM, the second tuner may tune for a time to a first media transponder stream, then tune for a time to a second media transponder stream, then tune to a third media transponder stream, etc. Eventually, the pattern is repeated. The pattern may skip the media transponder stream to which the first tuner is tuned and/or any other transponder stream to which other tuners of the television receiver are already tuned. Therefore, the pattern used at block 1130 may be dynamic in that the processors of the television receiver take into account which other media transponder streams are already being received by the television receiver. The pattern may also be based on factors such as channel popularity, a user's television channel change pattern (e.g., if the user is determined to be channel surfing up or down), a user's favorite channel list, etc.

Via the tuning of block 1130, the second tuner may be used to acquire ECMs for the multiple television channels that are transmitted on multiple media transponder streams at block 1140. Therefore, the second tuner may be performing blocks 1130 and 1140 repeatedly. The second tuner may tune to a first transponder stream, acquire some or all of the ECMs for the multiple television channels appearing on that particular transponder stream, then retune to another transponder stream and acquire ECMs for television channels that are transmitted as part of that media transponder stream.

As ECMs are acquired at block 1140, the acquired ECMs may be buffered at block 1150 in an ECM buffer for the multiple television channels. As ECMs are changed, the buffered ECMs may be updated to remain up to date.

At block 1160, a request to change from the first television channel to a second television channel may be received. This second television channel may be one of the multiple television channels for which ECMs were acquired and buffered using the second tuner. The request to change from the first television channel to the second television channel may involve retuning the first tuner. At block 1170, rather than waiting for the first tuner to acquire the necessary ECM from the media transport stream on which the second television channels carried, the ECM may be retrieved from the buffered ECMs. Therefore, the content of the first ECM used to decode the second television channel is acquired from the buffered ECMs obtained via the second tuner that has been rotating through media transponder streams in a repeating pattern.

At block 1180, the ECM retrieved from the buffered ECMs is decrypted to obtain CWs (or other forms of descrambling key). These CWs, in turn, may be used to descramble audio and video packets of the second television channel. Once descrambled, these video and audio packets may be decoded from a compressed format, such as MPEG, and output for presentation to a display device, such as a television. Future ECMs for the second television channel may be received on the media transponder stream by the first tuner. Therefore only the first ECM for decryption in decoding for the second television channel may be retrieved from the buffered ECMs (which was received via the second tuner); all subsequent ECMs may be obtained directly from the media transponder stream by the first tuner.

Figure 12:
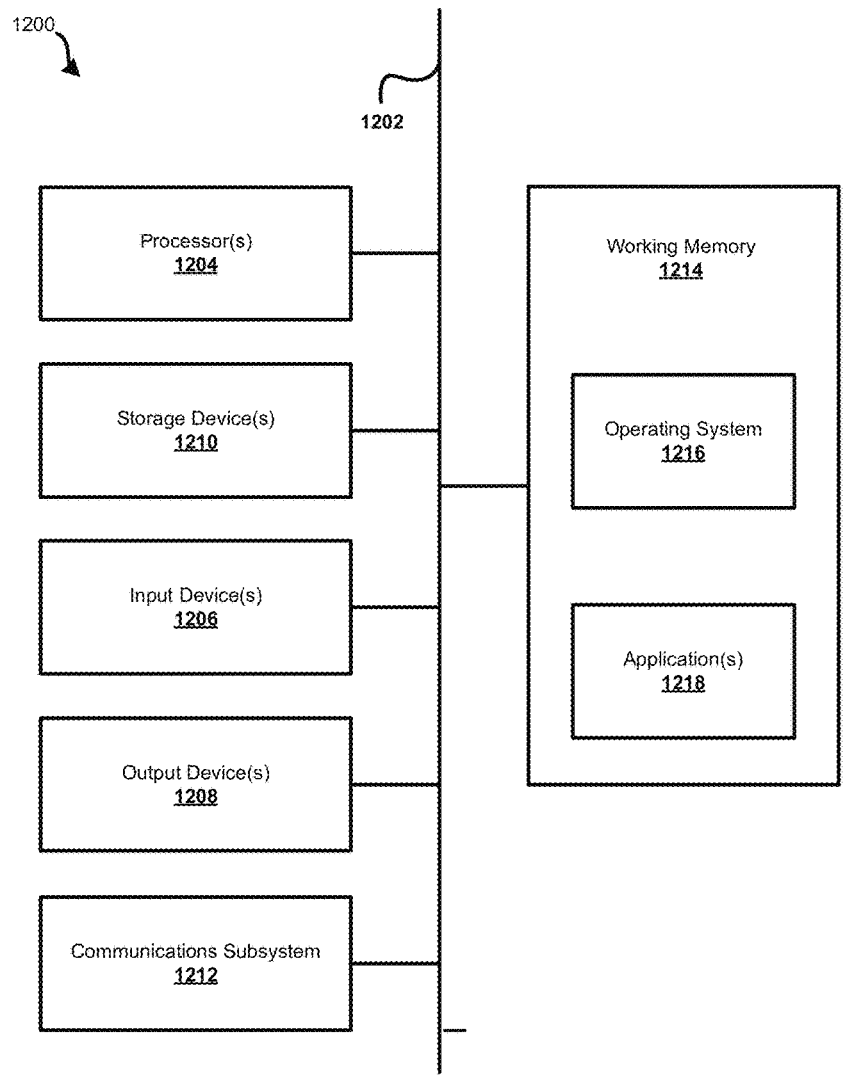
FIG. 12 illustrates an embodiment of a computer system that may be incorporated as part of the television receiver and/or other computerized devices detailed herein.

FIG. 12 shows an example computer system 1200 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. The computer system 1200 may be wholly or at least partially incorporated as part of previously-described computing devices, such as any of the respective elements of at least FIG. 2. Further, the computer device 1200 may be configured to perform and/or include instructions that, when executed, cause the computer system 1200 to perform the method of FIG. 1. Still further, the computer device 1200 may be configured to perform and/or include instructions that, when executed, cause the computer system 1200 to instantiate and implement functionality of the PTR 210 and/or LNB 400.

The computer device 1200 is shown comprising hardware elements that may be electrically coupled via a bus 1202 (or may otherwise be in communication, as appropriate). The hardware elements may include a processing unit with one or more processors 1204, including without limitation one or more general-purpose processors and/or one or more special-purpose processors (such as digital signal processing chips, graphics acceleration processors, and/or the like); one or more input devices 1206, which may include without limitation a remote control, a mouse, a keyboard, and/or the like; and one or more output devices 1208, which may include without limitation a presentation device (e.g., television), a printer, and/or the like.

The computer system 1200 may further include (and/or be in communication with) one or more non-transitory storage devices 1210, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1200 might also include a communications subsystem 1212, which may include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 1212 may permit data to be exchanged with a network (such as the network described below, to name one example), other computer systems, and/or any other devices described herein. In many examples, the computer system 1200 will further comprise a working memory 1214, which may include a random access memory and/or a read-only memory device, as described above.

The computer device 1200 also may comprise software elements, shown as being currently located within the working memory 1214, including an operating system 1216, device drivers, executable libraries, and/or other code, such as one or more application programs 1218, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1210 described above. In some cases, the storage medium might be incorporated within a computer system, such as computer system 1200. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1200) to perform methods in accordance with various examples of the disclosure. According to a set of examples, some or all of the procedures of such methods are performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 may cause the processor(s) 1204 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 1200, various computer-readable media might be involved in providing instructions/code to processor(s) 1204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1210. Volatile media may include, without limitation, dynamic memory, such as the working memory 1214.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code. Various forms of computer-readable media may be involved in carrying one or more sequences of one or more instructions to the processor(s) 1204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1212 (and/or components thereof) generally will receive signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204.

It should further be understood that the components of computer device 1200 can be distributed across a network. For example, some processing may be performed in one location using a first processor while other processing may be performed by another processor remote from the first processor. Other components of computer system 1200 may be similarly distributed. As such, computer device 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a television receiver, the method comprising:
   determining, by the television receiver, that a first tuner of the television receiver is idle by determining that the first tuner is not being used for receiving any media transponder stream for output or recording;
   in response to determining that the first tuner is idle, tuning, by the television receiver, the first tuner of the television receiver to a decryption key transponder stream, wherein:
      the decryption key transponder stream comprises a plurality of decryption keys for a plurality of television channels that are transmitted to the television receiver via a plurality of transponder streams, wherein the plurality of decryption keys in the decryption key transponder stream are repeatedly transmitted in a particular pattern;
   decrypting, by a smartcard of the television receiver, the plurality of decryption keys to obtain a plurality of descrambling keys;
   buffering, by the television receiver, the plurality of descrambling keys;
   tuning, by the television receiver, a second tuner of the television receiver to a media transponder stream to receive a television channel of the plurality of television channels, wherein the television channel comprises video packets and audio packets, the media transponder stream comprises a subset of television channels of the plurality of television channels and decryption key packets for the subset of television channels of the plurality of television channels;
   decoding, by the television receiver, video packets and audio packets of the television channel using one or more descrambling keys from the buffered plurality of descrambling keys obtained from the decryption key transponder stream, wherein the one or more descrambling keys were decrypted from the plurality of decryption keys of the decryption key transponder stream; and
   receiving, via the second tuner of the television receiver, subsequent decryption keys for the television channel directly from the media transponder stream.

2. The method of claim 1, wherein the plurality of decryption keys are a plurality of entitlement control messages (ECMs).

3. The method of claim 1, wherein the plurality of descrambling keys are a plurality of control words (CWs).

4. The method of claim 1, wherein the smartcard is removable from the television receiver.

5. The method of claim 1, further comprising:
   transmitting, by a television service provider, the decryption key transponder stream such that each decryption key of the plurality of decryption keys are transmitted only once on the decryption key transponder stream while the decryption key is valid.

6. The method of claim 1, further comprising:
   identifying, by the television receiver, the one or more descrambling keys based on a packet identifier (PID)

mapped to a decryption key of the plurality of decryption keys from which the one or more descrambling keys were initially decrypted.

7. A television receiver, comprising:
a television interface;
a plurality of tuners;
a controlled access device;
one or more processors; and
a memory communicatively coupled with and readable by the one or more processors and having stored therein processor-readable instructions which, when executed by the one or more processors, cause the one or more processors to:
  determine that a first tuner of the plurality of tuners is not being used to receive any media transponder stream for output or recording;
  in response to determining that the first tuner is not being used to receive any media transponder stream for output or recording, tune the first tuner of the plurality of tuners to a decryption key transponder stream, wherein:
    the decryption key transponder stream comprises a plurality of decryption keys for a plurality of television channels that are transmitted to the television receiver via a plurality of transponder streams, wherein the plurality of decryption keys in the decryption key transponder stream are repeatedly transmitted in a pattern;
  cause the plurality of decryption keys to be decrypted by the controlled access device to obtain a plurality of descrambling keys;
  store the decrypted plurality of descrambling keys;
  tune a second tuner of the plurality of tuners to a media transponder stream to receive a television channel of the plurality of television channels, wherein:
    the television channel comprises video packets and audio packets; and
    the media transponder stream comprises a subset of television channels of the plurality of television channels and decryption key packets for the subset of television channels of the plurality of television channels;
  decode the television channel using one or more of the plurality of decrypted descrambling keys and output the television channel via the television interface, wherein the one or more descrambling keys were decrypted from the plurality of decryption keys of the decryption key transponder stream; and
  receive, via the second tuner of the television receiver, subsequent decryption keys for the television channel directly from the media transponder stream.

8. The television receiver of claim 7, wherein the plurality of decryption keys are a plurality of entitlement control messages (ECMs).

9. The television receiver of claim 7, wherein the controlled access device is a smartcard that is removable from the television receiver.

10. The television receiver of claim 7, wherein the decryption key transponder stream is received such that each decryption key of the plurality of decryption keys is received only once as part of the decryption key transponder stream while the decryption key is valid.

11. A television channel decoding system, comprising:
a satellite-based television channel distribution system that transmits a decryption key transponder stream and a plurality of media transponder streams via one or more satellites;
a television receiver, comprising:
  a television interface;
  a plurality of tuners;
  a controlled access smartcard;
  one or more processors; and
  a memory communicatively coupled with and readable by the one or more processors and having stored therein processor-readable instructions which, when executed by the one or more processors, cause the one or more processors to:
    determine that a first tuner of the plurality of tuners is idle by determining that the first tuner is not being used for receiving any media transponder stream for output or recording;
    in response to determining that the first tuner is idle, tune the first tuner of the plurality of tuners to the decryption key transponder stream, wherein:
      the decryption key transponder stream comprises a plurality of decryption keys for a plurality of television channels that are separately transmitted to the television receiver via the plurality of media transponder streams; and
      the plurality of decryption keys in the decryption key transponder stream are repeatedly transmitted in a pattern;
    cause the plurality of decryption keys to be decrypted by the controlled access smartcard to obtain a plurality of descrambling keys;
    store the plurality of descrambling keys;
    tune a second tuner of the plurality of tuners to a media transponder stream to receive a television channel of the plurality of television channels, wherein:
      the television channel comprises video packets and audio packets; and
      the media transponder stream comprises a subset of the plurality of television channels and decryption key packets for the subset of television channels of the plurality of television channels;
    decode the television channel using one or more of the stored plurality of descrambling keys, wherein the one or more descrambling keys of the stored plurality of descrambling keys were decrypted from the plurality of decryption keys of the decryption key transponder stream; and
    receive, via the second tuner of the television receiver, subsequent decryption keys for the television channel directly from the media transponder stream.

12. The television channel decoding system of claim 11, wherein the satellite-based television channel distribution system transmits the decryption key transponder stream such that each decryption key of the plurality of decryption keys are transmitted only once on the decryption key transponder stream while the decryption key is valid.

* * * * *